(12) United States Patent
McCorkendale

(10) Patent No.: US 11,558,365 B1
(45) Date of Patent: Jan. 17, 2023

(54) MULTI-SECOND FACTOR AUTHENTICATION

(71) Applicant: NortonLifeLock Inc., Tempe, AZ (US)

(72) Inventor: Bruce McCorkendale, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 367 days.

(21) Appl. No.: 15/728,868

(22) Filed: Oct. 10, 2017

(51) Int. Cl.
*H04L 29/06* (2006.01)
*H04L 9/40* (2022.01)

(52) U.S. Cl.
CPC ........ *H04L 63/083* (2013.01); *H04L 63/0861* (2013.01); *H04L 63/107* (2013.01); *H04L 2463/082* (2013.01)

(58) Field of Classification Search
CPC .................................................... H04L 63/083
See application file for complete search history.

(56) References Cited

U.S. PATENT DOCUMENTS

| | | | | |
|---|---|---|---|---|
| 7,404,086 B2 * | 7/2008 | Sands | .................. | H04L 63/107 713/186 |
| 8,365,258 B2 * | 1/2013 | Dispensa | ............ | H04L 63/0869 726/5 |
| 8,639,629 B1 * | 1/2014 | Hoffman | ................ | G06Q 20/20 705/44 |
| 8,769,643 B1 * | 7/2014 | Ben Ayed | ............ | H04W 12/06 726/5 |
| 8,782,264 B2 * | 7/2014 | Harrison | ............ | G06Q 20/2295 709/229 |
| 9,160,545 B2 * | 10/2015 | Iverson | .................. | H04L 9/3228 |
| 9,380,058 B1 * | 6/2016 | Ligatti | ............... | H04L 63/0853 |
| 9,686,272 B2 * | 6/2017 | Blinn | .................... | H04L 63/083 |
| 10,439,868 B2 * | 10/2019 | Lim | ..................... | H04N 5/4403 |
| 2008/0086764 A1 * | 4/2008 | Kulkarni | ............... | H04L 9/3234 726/7 |
| 2008/0120711 A1 * | 5/2008 | Dispensa | ................ | H04L 63/08 726/7 |
| 2008/0307515 A1 * | 12/2008 | Drokov | .................. | G06Q 20/32 726/7 |
| 2013/0297513 A1 * | 11/2013 | Kirillin | .................. | G06Q 40/02 705/67 |
| 2013/0347129 A1 * | 12/2013 | Samuelsson | ........ | H04L 63/0838 726/28 |
| 2014/0189808 A1 * | 7/2014 | Mahaffey | ............ | H04L 63/0853 726/4 |
| 2014/0282866 A1 * | 9/2014 | Jakobsson | ............... | H04L 63/08 726/3 |

(Continued)

FOREIGN PATENT DOCUMENTS

WO   WO-2014201042 A1 * 12/2014   ......... G06Q 30/0269

*Primary Examiner* — Tri M Tran
(74) *Attorney, Agent, or Firm* — Holland & Hart LLP

(57) ABSTRACT

A method for securing and authorizing sensitive operations is described. A computing device may receive a first authentication factor from a second computing device based on a request from the second computing device to authorize an operation; upon validating the first authentication factor, send to at least the second computing device and a third computing device, a request for a second authentication factor; and authorize the operation based on validating the second authentication factor from the second computing device or from the third computing device, or from both.

20 Claims, 13 Drawing Sheets

(56) References Cited

U.S. PATENT DOCUMENTS

| | | | | |
|---|---|---|---|---|
| 2015/0178510 | A1* | 6/2015 | Handler | G06F 21/606 726/21 |
| 2017/0032111 | A1* | 2/2017 | Johansson | H04L 63/0884 |
| 2017/0053108 | A1* | 2/2017 | Jakobsson | H04L 63/10 |

* cited by examiner

MULTI-SECOND FACTOR AUTHENTICATION

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Malware programmers are continually adapting to the improvements made in malware detection. Due to the adapted methods and implementations imposed by malware programmers, security methods for securing and authorizing sensitive operations may be beneficial in detecting malicious behavior and mitigating related issues.

SUMMARY

The described techniques relate to improved methods, systems, or computing devices that support securing and authorizing sensitive operations to protect data and computing devices against malicious programs such as e.g., viruses, worms, Trojans, spyware, adware, rootkits. A sensitive operation may include a digital signing operation that may be sensitive because of using a private key to perform the digital signing operation. That is, digitally signing software code, firmware code, hardware code, data, or any combination thereof using a private key may be an indication that a computing device using the private key is the authentic source of the private key, and that the software code, the firmware code, the hardware code, the data, or any combination has not been tampered (e.g., infected with malware) since the digital signing operation. The operation may also be a firmware signing operation including executable code and data. For example, firmware code to a router may be signed as a set of data that includes data and executable code. The firmware code may be a combination of all code (e.g., classes, sub-classes, functions, calls, etc.) and data (e.g., configuration files) that encompasses an operating system and the environment a computing device is running in.

In some implementations, a build automation may perform the digital signing operations or the firmware signing operations, or both. The build automation may be a process of automating creation of a software or firmware build and the associated processes including: compiling computer source code into binary code, packaging binary code, and running automated tests. In these implementations, processes and system calls to one or more services that perform a sensitive operation should be protected and secured by requiring a certificate or other form of credentials (e.g., authentication factors). An automated build process may automatically fetch credentials to authenticate with the one or more services in order to request and execute the sensitive operation. However, automated build processes and the corresponding hardware may not be secured, and the credentials used by the automated build processes may also be unprotected; as a consequence the sensitive operations may be at risk of compromise by malicious entities. Due to the adapted techniques and implementations imposed by malicious entities (e.g., malware programmers), the present disclosure provides improved techniques for better securing and authorizing access to sensitive operations.

A method for securing and authorizing sensitive operations at a computing device is described. The method may include receiving, at a first computing device, a first authentication factor from a second computing device based at least in part on a request from the second computing device to authorize an operation; upon validating the first authentication factor, sending, by the first computing device to at least the second computing device and a third computing device, a request for a second authentication factor; and authorizing, by the first computing device, the operation based at least in part on validating the second authentication.

A computing device for securing and authorizing sensitive operations at the computing device is described. The computing device may include a processor, memory in electronic communication with the processor. The memory may store computer executable instructions that when executed by the one or more processors cause the one or more processors to receive a first authentication factor from a second computing device based at least in part on a request from the second computing device to authorize an operation; upon validating the first authentication factor, send to at least the second computing device and a third computing device, a request for a second authentication factor; and authorize the operation based at least in part on validating the second authentication.

A non-transitory computer-readable medium for securing and authorizing sensitive operations is described. The non-transitory computer-readable medium may include instructions that when executed by the one or more processors cause the one or more processors to receive a first authentication factor from a second computing device based at least in part on a request from the second computing device to authorize an operation; upon validating the first authentication factor, send to at least the second computing device and a third computing device, a request for a second authentication factor; and authorize the operation based at least in part on validating the second authentication.

In some examples of the method, apparatus, and non-transitory computer-readable medium described above, the first authentication factor or the second authentication factor or both include at least one of a knowledge factor, a possession factor, a disconnected token, a connected token, or an inherence factor, or any combination thereof.

In some examples of the method, apparatus, and non-transitory computer-readable medium described above, the second authentication factor is sent to two or more computing devices associated with a certain number of individuals predetermined as authorizers of the operation, the two or more computing devices including the second computing device and the third computing device. Some examples of the method, computing device, and non-transitory computer-readable medium described above for authorizing the operation may further include processes, features, means, or instructions for validating each second authentication factor received from the two or more computing devices; and determining whether a response sent with each received second authentication factor indicates an affirmative response to permit the operation or indicates a rejection response to deny the operation.

Some examples of the method, computing device, and non-transitory computer-readable medium described above may further include processes, features, means, or instructions for identifying how many validated second authentication factors affirm the operation; and determining whether the number of validated second authentication factors that affirm the operation satisfies a predetermined threshold. Some examples of the method, computing device, and non-transitory computer-readable medium described above may further include processes, features, means, or instructions for upon determining the number of validated second authentication factors that affirm the operation satisfies the predetermined threshold, authorizing the operation; and upon determining at least one of the validated second authentication factors received rejects the operation or upon determining the number of validated second authentication factors received that affirm the operation fails to satisfy the predetermined threshold, denying the operation.

Some examples of the method, computing device, and non-transitory computer-readable medium described above may further include processes, features, means, or instructions for upon determining at least one of the validated second authentication factors rejects the operation, sending a denial notification to at least one of the first computing devices, at least one of the two or more computing devices, or any combination thereof.

Some examples of the method, computing device, and non-transitory computer-readable medium described above may further include processes, features, means, or instructions for upon determining at least one of the second authentication factors received from the two or more computing devices fails validation, performing a security action based at least in part on the determining. Some examples of the method, computing device, and non-transitory computer-readable medium described above for performing the security action may further include processes, features, means, or instructions for obtaining information associated with the failed second authentication factor or the computing device that sent the failed second authentication factor, or both; and providing for display the obtained information to the first computing device, at least one of the two or more computing devices, a predetermined administrator, or any combination thereof.

Some examples of the method, computing device, and non-transitory computer-readable medium described above may further include processes, features, means, or instructions for ranking the two or more computing devices based at least in part on a priority level associated with each of the two or more computing devices or an individual associated with each of the two or more computing devices, or both.

In some examples of the method, apparatus, and non-transitory computer-readable medium described above, the operation is associated with at least one of access to a user account, access to a bank account, access to a trust fund, access to an inheritance, access to a service, access to a software application, access to a subscription, access to software code, access to firmware code, access to hardware code, access to remote procedure call middleware, access to database middleware, access to transaction middleware, access to embedded middleware, access to content-centric middleware, or any combination thereof. In some examples of the method, apparatus, and non-transitory computer-readable medium described above, the operation comprises at least one of a digital signing operation associated with at least one of software code or data, or both.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
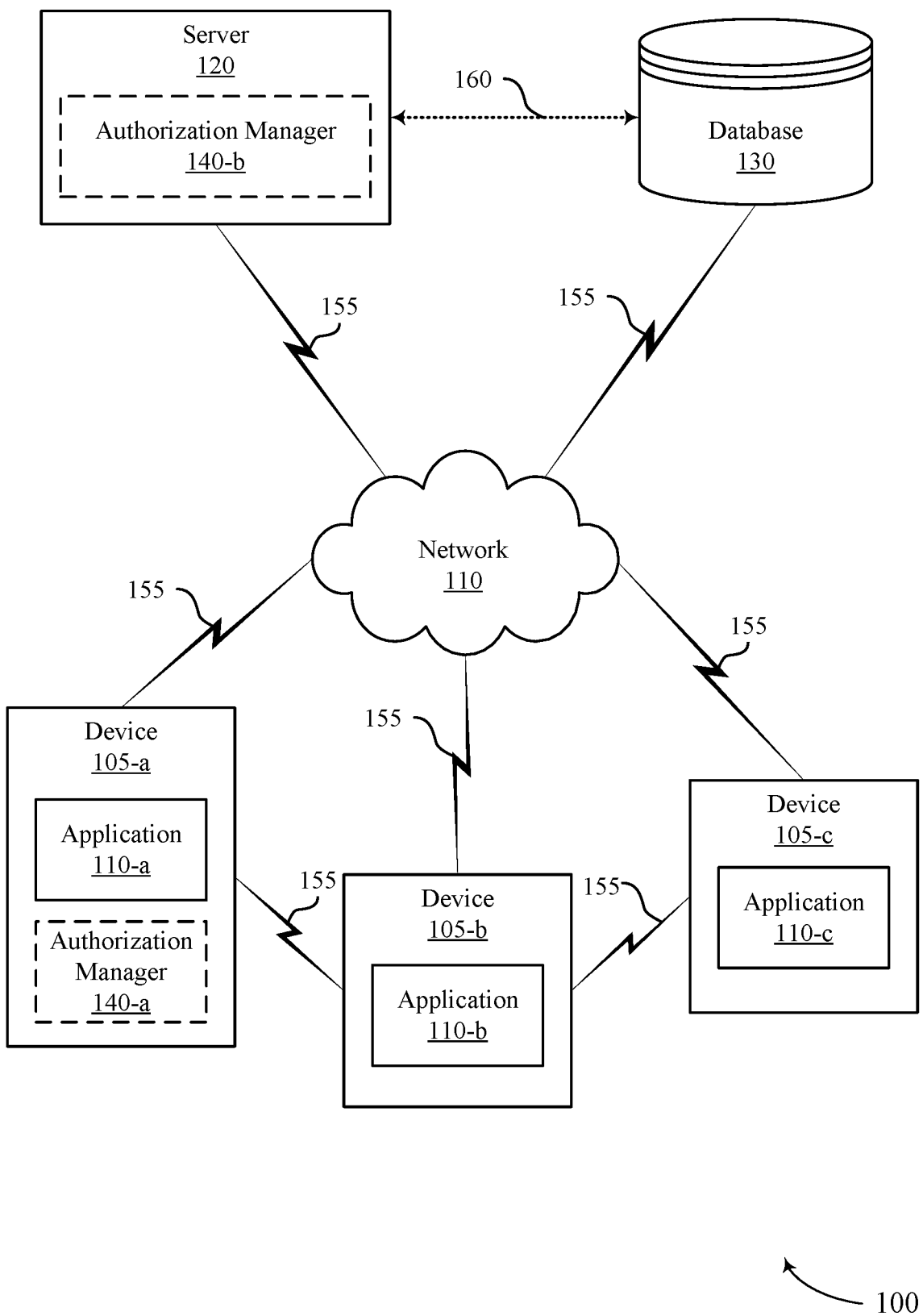
FIG. 1 illustrates a block diagram of an environment that supports securing and authorizing sensitive operations to protect against malicious programs, in accordance with aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Malware programmers have implemented a variety of methods and techniques for performing malicious behavior, including data theft and ransomware. The procedures may be implemented via malicious programs (e.g., viruses, worms, etc.) as part of at least a software install or file execution at a computing device. The described disclosure is generally directed to improved techniques that support securing and authorizing sensitive operations to protect data and computing devices against malicious programs such as malware, ransomware, spyware, etc. Existing multi-factor authentication techniques allow a first authentication factor e.g., a username and password credentials, to be associated with a second authentication factor e.g., software token. Systems implementing the existing multi-factor authentication techniques: validate the first authentication factor, identify an identifier for the software token, and send a call to an application programming interface (API) indicating that the software token requests an authentication. The system then receives an indication if the second authentication factor (i.e., software token) was successfully completed (e.g., an individual clicks "approve" in a mobile application). However, existing techniques are lacking and avoid mitigating threats from malicious entities compromising credentials and tampering sensitive operations (e.g., infecting an executable code with malware). Furthermore, existing multi-factor authentication techniques involve a single individual providing both authentication factors via computing device.

According to the techniques described herein, securing and authorizing sensitive operations to protect data and computing devices against malicious program may be provided by securing a first authentication factor (e.g. credentials) associated with a first individual of a first computing device with a number of different individuals second authentication factors (e.g. VIP token). That is, instead of a 1:1 match between a first authentication factor and a second authentication factor (i.e., software token), the techniques described herein provide multiple second authentication factors associated with a single first authentication factor. As a result, the improved techniques described herein support a 1:N match, where N is a positive integer. The number of second authentication factors may be configurable. In some cases, a threshold number of second authentication factors may have to be successfully completed prior to authorizing a sensitive operation. For example, the configuration may require a majority, at least one, more than one, or some percentage of the number of second authentication factors to authorize a sensitive operation.

Aspects of the disclosure are initially described in the context of a wireless communications system. Exemplary devices, servers, and process flows that support securing and authorizing sensitive operations to protect against malicious programs (e.g., viruses, worms, Trojans, spyware, adware, rootkits), in accordance with aspects of the present disclosure. Aspects of the disclosure are further illustrated by and described with reference to apparatus diagrams, system diagrams, and flowcharts that relate to generating and applying adversarial perturbations to electronic media to protect against malicious programs.

FIG. 1 illustrates a block diagram of an environment 100 that supports securing and authorizing sensitive operations to protect against malicious programs (e.g., viruses, worms, Trojans, spyware, adware, rootkits), in accordance with aspects of the present disclosure. In some embodiments, the techniques described herein may be performed on a device (e.g., computing device 105 or server 120). As depicted, the environment 100 may include a computing device 105-*a*, a computing device 105-*b*, a computing device 105-*c*, a server 120, and a database 130. In the illustrated embodiment, the computing device 105-*a*, the computing device 105-*b*, the computing device 105-*c*, the server 120, and the database 130, are communicatively coupled via network 110 e.g., via wireless communication links 155.

The computing devices 105 in environment 100 may be used by way of example. While, environment 100 illustrates three computing devices 105, the present disclosure applies to any system architecture having one or more computing devices 105. Furthermore, while a single network 110 is coupled to the computing device 105-*a*, the computing device 105-*b*, the computing device 105-*c*, the server 120, and the database 130, the present disclosure applies to any system architecture having any number of networks 110 that may be communicatively coupled to the computing device 105-*a*, the computing device 105-*b*, the computing device 105-*c*, the server 120, and the database 130. Similarly, while environment 100 illustrates a single server 120, the present disclosure applies to any system architecture having one or more servers.

In some embodiments, the computing device 105-*a*, the computing device 105-*b*, the computing device 105-*c*, the server 120, and the database 130 may include a personal electronic device such as a cellular phone, a personal digital assistant (PDA), a tablet computer, a laptop computer, or a personal computer. In some embodiments, the computing device 105-*a*, the computing device 105-*b*, the computing device 105-*c* may include an application 110-*a*, an application 110-*b*, and an application 110-*c*. The computing device 105-*a* may also optionally include an authorization manager 140-*a*. While, environment 100 illustrates the computing device 105-*a* optionally including the authorization manager 140-*a*, the present disclosure applies to any of the computing devices 105 optionally having an authorization manager.

Applications 110 in some examples, may be an internet-based service such as a user account, a bank account, a trust fund, an inheritance, a service (e.g., social network, software build), a subscription (e.g., video streaming subscription), software code, firmware code, hardware code, etc. Although the components of the computing devices 105 are depicted as being internal to the computing device 105, it is understood that one or more of the components may be external to the computing device 105 and connect to computing device 105 through wired or wireless connections, or both, e.g., via wireless communication links 155.

Server 120 may be a computer system or an application that may be an intermediary node in environment 100 between the computing device 105-*a*, the computing device 105-*b*, the computing device 105-*c*, or the database 130. For example, server 120 may receive requests from device 105 seeking resources from database 130. In another example, server 120 may receive requests from the computing device 105-*a*, the computing device 105-*b*, or the computing device 105-*c*, instructing the server 120 to authorize an operation. The operation, in some examples, may be a digital signing operation associated with at least one of software code or data, or both. Data may include configuration files, web page sources, scripts, and any other data that may be used by an operating system or an application executing and running on the computing device 105-*a*, the computing device 105-*b*, or the computing device 105-*c*. Server 120 may include any combination of a social network server, data server, a cloud server, a server associated with an automation service provider, proxy server, mail server, web server, application server, database server, communications server, file server, home server, mobile server, name server, or any combination thereof.

In some embodiments, the computing devices 105 may communicate with the server 120 via network 110. Examples of network 110 may include any combination of cloud networks, local area networks (LAN), wide area networks (WAN), virtual private networks (VPN), wireless networks (using 802.11, for example), cellular networks (using 3G, LTE, or new radio (NR) systems (e.g., 5G) for example), etc. In some configurations, the network 110 may include the Internet. It is noted that in some embodiments, the computing devices 105 may not include an authorization manager. For example, the computing devices 105 may include the applications 110 that allows the computing devices 105 to interface with an authorization manager 140-*b* located on another device such as the server 120.

In some embodiments, the computing devices 105 and the server 120 may include an authorization manager where at least a portion of the functions of authorization manager are performed separately or concurrently on the computing devices 105 or the server 120, or both. Similarly, in some embodiments, a user may access the functions of the computing devices 105 (directly or through computing device 105 via an authorization manager). For example, in some embodiments, the computing device 105-*a* may include a mobile-based application that interfaces with one or more functions of authorization manager 140-*a* or the server 120.

In some embodiments, the server 120 may be coupled to the database 130, via communication link 160. Database 130 may be internal or external to the server 120. In one example, one or more of the computing devices 105 may be coupled directly to database 130, the database 130 being internal or external to the computing devices 105. The database 130 may include stored electronic authentication data (e.g., associated with a knowledge factor, a possession factor, a disconnected token, a connected token, or an inherence factor, or any combination thereof).

In some cases, the computing devices 105 or the server 120 may provide a privacy protection service. The privacy protection service may be an internet-based service, or it may be a computing device-based application, i.e., an application running on the computing devices 105. The privacy protection service may provide securing and authorizing sensitive operations. A sensitive operation may include a digital signing operation that may be sensitive because of using a private key to perform the digital signing operation. That is, digitally signing software code, firmware code, hardware code, data, or any combination thereof using a private key may be an indication that the computing device 105 using the private key is the authentic source of the private key, and that the software code, the firmware code, the hardware code, the data, or any combination has not been tampered (e.g., infected with malware) since the digital signing operation. The operation may also be a firmware signing operation including executable code and data. For example, firmware code to a router may be signed as a set of data that includes data and executable code. The firmware code may be a combination of all code (e.g., classes, sub-classes, functions, calls, etc.) and data (e.g., configuration files) that encompasses an operating system and an environment a computing device is operating-in.

In some implementations, a build automation may perform the digital signing operations or the firmware signing operations, or both. The build automation may be a process of automating creation of a software or firmware build and the associated. In these implementations, processes and system calls to one or more services that perform a sensitive operation should be protected and secured by requiring a certificate or other form of credentials (e.g., authentication factors). An automated build process may automatically fetch credentials to authenticate with the one or more services in order to request and execute the sensitive operation. However, automated build processes and the corresponding hardware may not be secured, and the credentials used by the automated build processes may also be unprotected; as a consequence the sensitive operations may be at risk of compromise by malicious entities.

Due to the adapted techniques and implementations imposed by malicious entities (e.g., malware programmers), the techniques described herein may support securing and authorizing sensitive operations to protect data and computing devices 105 against malicious program by securing a first authentication factor (e.g. credentials) associated with a first individual of a first computing device with a number of different individuals second authentication factors (e.g. VIP token). That is, instead of a 1:1 match between a first authentication factor and a second authentication factor (i.e., software token), the techniques described herein provide multiple second authentication factors associated with a single first authentication factor. As a result, the improved techniques described herein support a 1:N match, where N is an integer. The number of second authentication factors may be configurable. In some cases, a threshold number of second authentication factors may have to be successfully completed prior to authorizing a sensitive operation. For example, the configuration may require a majority, at least one, more than one, or some percentage of the number of second authentication factors to authorize a sensitive operation.

The techniques described herein beneficially provide improvements for securing and authorizing access to sensitive operations by using multiple second authentication factors associated with a single first authentication factor. Furthermore, the techniques described herein provide improvements to the operation of a computing device (e.g., computing devices 105). For example, by mitigating potential risks of malicious entities embedding malware onto a computing device, the operating characteristics such as central processing unit (CPU) usage and memory usage of the computing device may be conserved. In addition, the techniques described herein may improve security of applications, data, services, subscriptions executing on the computing device. The techniques described herein may also provide efficiency to the computing device by reducing potential latency associated with encumbered computing devices from infected malware.

Figure 2A:
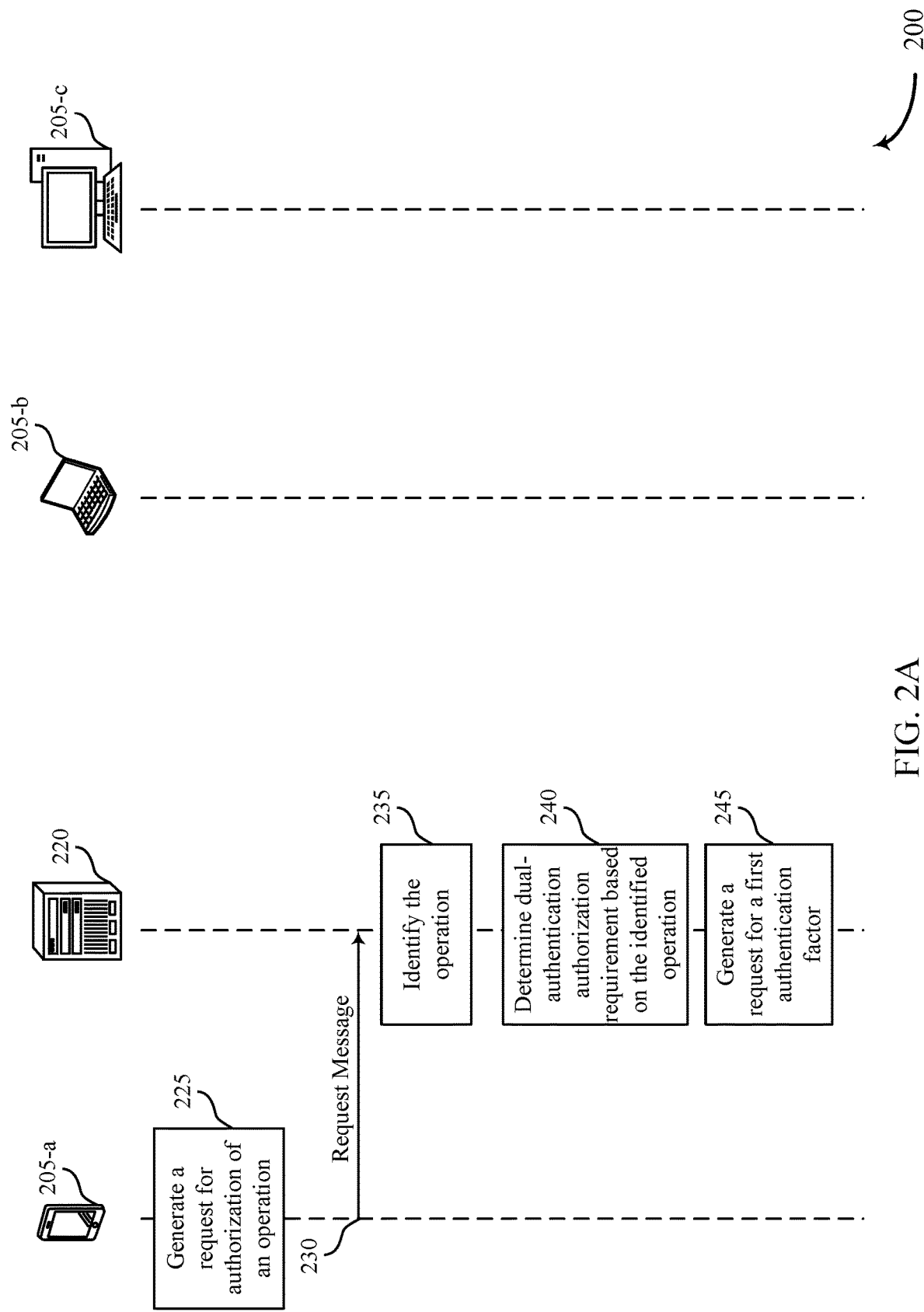
FIGS. 2A through 2C illustrate a process flow that supports securing and authorizing sensitive operations to protect against malicious programs, in accordance with aspects of the present disclosure.
Figure 2B:
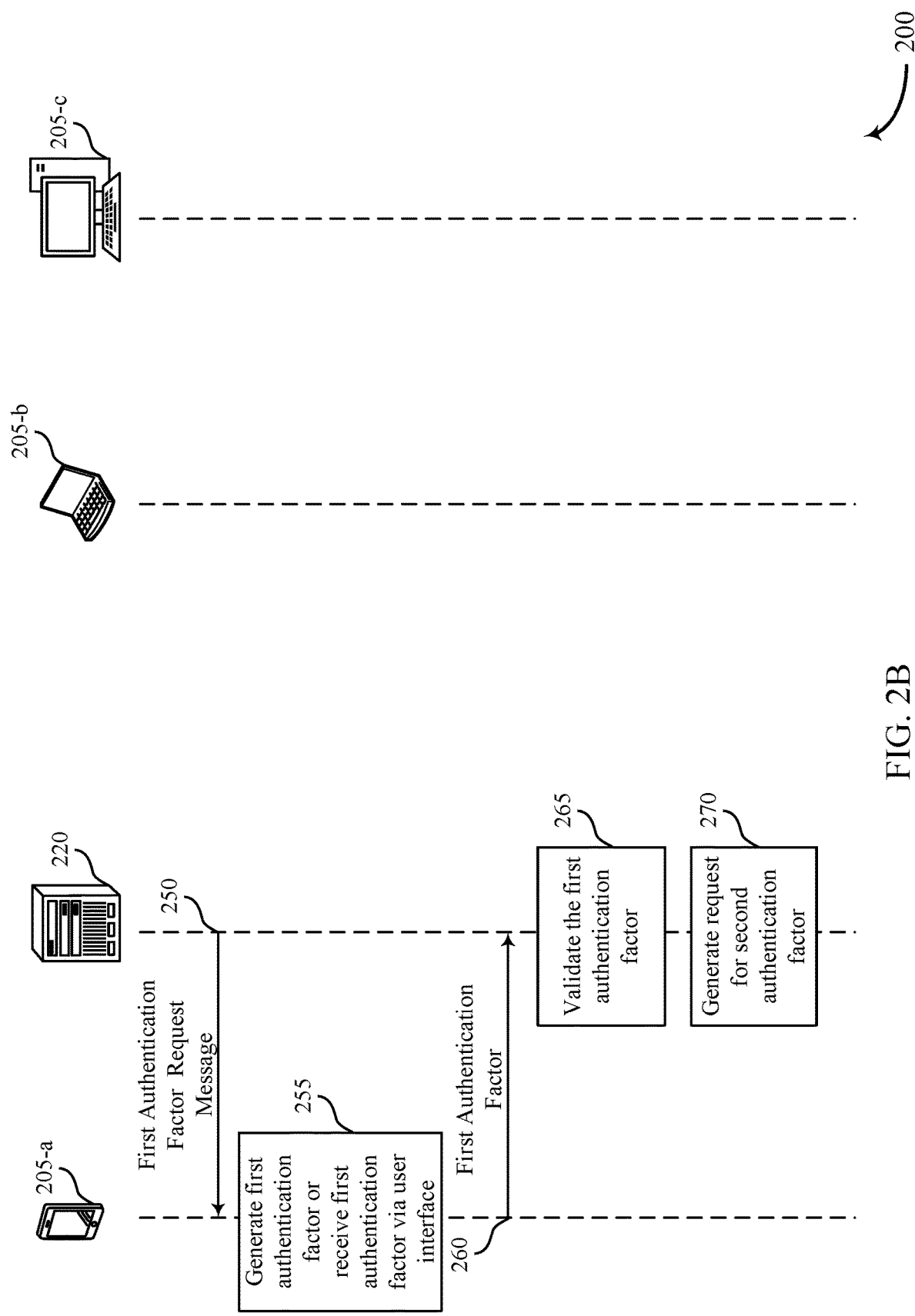
Figure 2C:
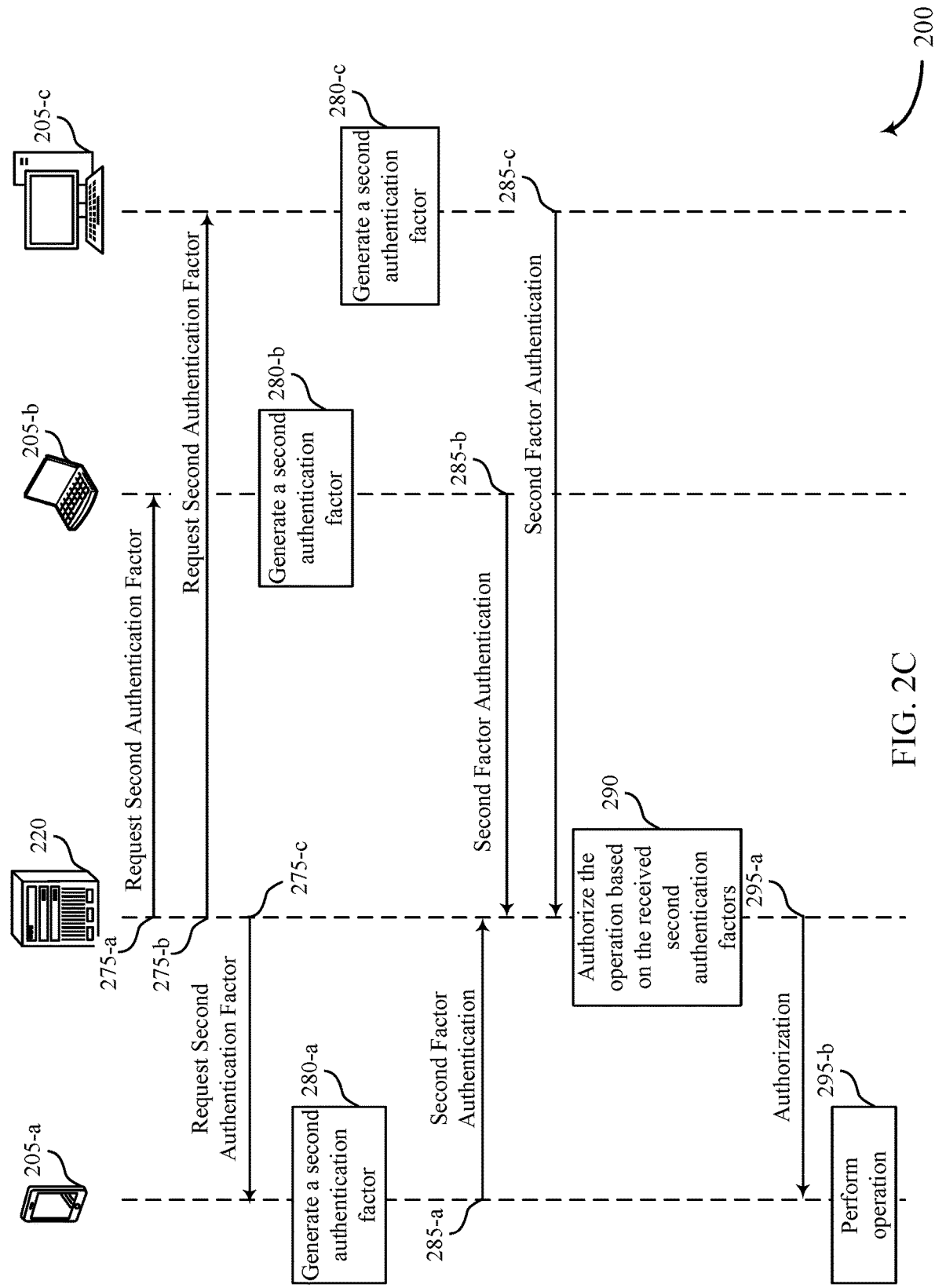

FIGS. 2A through 2B illustrate a process flow 200 that supports securing and authorizing sensitive operations to protect against malicious programs, in accordance with aspects of the present disclosure. In some examples, process flow 200 may implement aspects of system 100. Computing device 205-*a*, computing device 205-*b*, and computing device 205-*c* may be examples of corresponding devices described with reference to FIG. 1. Server 220 may be examples of corresponding devices described with reference to FIG. 1. In some configurations, process flow 200 may be implemented by the authorization manager 140 as described in FIG. 1. In some configurations, process flow 200 may be implemented in conjunction with the application 110 described with reference to FIG. 1.

In the following description of the process flow 200, the operations between the computing device 205-*a*, the computing device 205-*b*, the computing device 205-*c*, and the server 220 may be transmitted in a different order than the exemplary order shown, or the operations performed by the computing device 205-*a*, the computing device 205-*b*, the computing device 205-*c*, and the server 220 may be performed in different orders or at different times. Certain operations may also be left out of the process flow 200, or other operations may be added to the process flow 200.

At block 225, the computing device 205-*a* may generate a request for authorization of an operation. The operation, in some examples, may be a digital signing operation associated with at least one of software code or data, or both. Data may include configuration files, web page sources, scripts, and any other data that may be used by the computing device 205-*a* operating system or an application (e.g., application 110) executing and running on the computing device 205-*a*. For example, computing device 205-*a* may generate a request to create or update a configuration file. The configuration file may be stored in a database (e.g., database 130) and retrieved or referenced by the server 220. In some cases, the computing device 205-*a* may automatically or manually initiate generating of the request. In the case of automatically initiating, the computing device 205-*a* may be executing a build automation that my include one or more processes for automating creation of a software build and the associated processes may include compiling source code into binary code, packaging binary code, and running automated assessments. In the case of manually initiating, an individual associated with the computing device 205-*a* may access an application (e.g., automation build software) and request to authorize an operation (e.g., perform a software build, modify a routine, sub-class, class, function, configuration file). For example, the application (e.g., application 110) may provide an option for the individual to select via a user interface of the computing device, authorization to perform one or more operations associated with the application.

At 230, the computing device 205-*a* may transmit a request message to the server 220. The server 220 may be a hypertext transfer protocol (HTTP)-based web server. In some examples, the individual may be unaware of the computing device 205-*a* transmitting the request message to the server 220. For example, in the scenario of a malicious entity attempting to access an operation remotely, the server 220 may receive the message and begin collecting information (e.g., geo-location data, metadata, IP address, etc.) associated with the computing device 205-*a*, while providing an impression to the individual of the computing device 205-*a* that access to the operation is or has been given (e.g., providing a dummy interface where the operation may be performed).

At block 235, the server 220 may identify the operation. That is, the server 220 may identify the operation based on the received request. For example, the server 220 may identify the operation to be a request to access a user account (e.g., social network account), access to a bank account, access to a trust fund, access to an inheritance, access to a service, access to a software application, access to a subscription, access to software code, access to firmware code, access to hardware code, access to remote procedure call middleware, access to database middleware, access to transaction middleware, access to embedded middleware, access to content-centric middleware, or any combination thereof.

At block 240, the server 220 may determine multi-authentication factor authorization requirement based on the identified operation. The multi-authentication factor authorization requirement may indicate that a first authentication factor and one or more second authentication factors are required for the identified operation. At block 245, the server 220 may generate a request for a first authentication factor. At 250, the server 220 may transmit a first authentication factor request message to the computing device 205-*a*.

At block 255, the computing device 205-*a* may generate a first factor authentication or receive the first authentication factor via user interface. The first authentication factor may be a knowledge factor, a possession factor, a disconnected token, a connected token, or an inherence factor. The knowledge factor may be a category of authentication credentials including information that an individual of the computing device 205-*a* possess. For example, the knowledge factor may be a personal identification number (PIN), a user name and a password, or an answer to a secret question. The possession factor may be another example of a category of authentication credentials based on an item carried by the individual of the computing device 205-*a*. The item may be a physical hardware device (e.g., a security token or a mobile phone used in conjunction with a software token). The inherence factor may be another example of a category of authentication credentials including elements (e.g., biometric data) that are integral to the individual of the computing device. The biometric data may include samples, models, fingerprints, body characteristics, voice patterns, facial patterns, similarity scores and all verification or identification data excluding the individual's name and demographics. The connected token may be a device that is physically connected to the computing device 205-*a*, or the computing device 205-*b*, or the computing device 205-*c*, and transmits data automatically. The disconnected token may have no connection to the computing device 205-*a*, or the computing device 205-*b*, or the computing device 205-*c*. In addition, the disconnected token may have a built-in interface that displays a generated authentication data, which is manually entered by an individual at the computing device 205-*a*, or the computing device 205-*b*, or the computing device 205-*c*.

The computing device 205-*a* may have a predetermined duration to provide the first authentication factor to the server 220. For example, the computing device 205-*a* may have 30 seconds to provide a user name and a password, or an answer to a secret question before the server 220 may timeout the request to authorize the operation. In some cases, the server 220 may configure the predetermined duration. In other cases, an administrator of the software application, the bank account, the trust fund, the inheritance, the service, the subscription, the software code, the firmware code, the hardware code, the remote procedure call middleware, the database middleware, the transaction middleware, the embedded middleware, or the content-centric middleware may configure the predetermined duration to respond with providing the first authentication factor to the server 220. At 260, the computing device 205-*a* may transmit the first authentication factor to the server 220.

At block 265, the server 220 may validate the first authentication factor. For example, server 220 may validate the first authentication factor by comparing the first authentication factor to stored information (e.g., stored authentication factor) in a database (e.g., database 130). If a match exists, server 220 may confirm the request and continue the process of authorizing the request. However, if a match does not exist, server 220 may prompt the computing device 205-*a* to re-submit the first authentication factor. For example, server 220 may provide to the computing device 205-*a* a notification for display indicating that the provided first authentication factor could not be validated and to please re-provide the authentication factor. In some cases, the computing device 205-*a* may have a limited number of failures or attempts to resubmit the first authentication factor.

At block 270, the server 220 upon validating the first authentication factor, may generate a request for a second authentication factor. The server 220 may identify a number of additional or alternative computing devices for requesting the second authentication factor from. In some cases, the server 220 may identify the number of additional or alternative computing devices based on the operation. For example, the server 220 may parse a database (e.g., database 130) for a list of computing devices associated with the operation. The computing devices in the list may be associated with a certain number of individuals predetermined as authorizers of the operation. For example, the server 220 may identify the computing device 205-*b* and the computing device 205-*c* as being authorizes of the operation.

At 275-a, the server 220 may transmit a first request for second authentication factor to the computing device 205-b, and at 275-b the server 220 may transmit a second request for second authentication factor to the computing device 205-b. The second authentication factor may also include a knowledge factor, a possession factor, a disconnected token, a connected token, or an inherence factor. Additionally or alternatively, the second authentication factor may be a message including an option for the individual of the computing devices 205-b and 205-c to select and respond to the request to authorize the operation. For example, the message may be a dialogue box with an option for an individual to permit or reject the operation. Server 220 may also request same or different types of second authentication factors from the computing device 205-b and the computing device 205-c. For example, server 220 may request a knowledge factor from the computing device 205-b associated with an individual assigned as an authorizer of the operation and a possession factor from the computing device 205-c associated with a second individual assigned as the authorizer of the operation. As such, server 220 may allow securing of a first authentication factor (e.g., credentials) with a plurality of different individual's second authentication factor. In some embodiments, server 220 may configure as to whether any explicit denial causes failure and how many of the second authentication factors are required to be completed before the authentication is considered to be authorized. In addition, the server 220 may also request a second authentication factor from the requesting computing device (i.e., computing device 205-a).

At block 280-a, the computing device 205-b may generate a second authentication factor; and at block 280-b the computing device 205-c may also generate a second authentication factor. As described herein, the computing device 205-b or the computing device 205-c may provide a knowledge factor, a possession factor, a disconnected token, a connected token, or an inherence factor; or the computing device 205-b or the computing device 205-c may provide an acknowledgment response (i.e., permission) or non-acknowledgment response (i.e., rejection) associated with the operation. At 285-a, the computing device 205-b may provide the second authentication factor to the server 220; and at 285-b the computing device 205-c may also provide the second authentication factor to the server 220.

At block 290, the server 220 may authorize the operation based on the received second authentication factors. The server 220 may validate each second authentication factor received from the computing devices 205. In the example that the second authentication factor is associated with a message providing an option for an individual to permit or reject the operation, server 220 may track a number of permitted and rejected indications as part of validating each second authentication factor received. In another scenario, server 220 may validate the second authentication factor (e.g., the knowledge factor from the computing device 205-b and, the possession factor from the computing device 205-c) by comparing each second authentication factor to stored information (e.g., stored authentication factors) in a database (e.g., database 130).

The server 220 may determine whether a response sent with each received second authentication factor indicates an affirmative response to permit the operation or indicates a rejection response to deny the operation. The server 220 may track and record a number of received permitted and rejected indications from the computing devices 205. In some examples, the server 220 may identify how many validated second authentication factors affirm the operation. For example, server 220 may track a number of second authentication factors affirming the operation using a counter, which the server 220 may increment each time a second authentication factor is received affirming the operation. In some examples, the server 220 may authorize the operation based on the counter satisfying a threshold value (e.g., number of second received second authentication factors affirming the operation). For example, if a value of the counter after being incremented is equal to the threshold value, the server 220 may determine to authorize the operation.

The server 220 may also determine whether the number of validated second authentication factors that affirm the operation satisfies a predetermined threshold. The predetermined threshold may include a number or a percentage of second authentication factors affirming the operation. If server 220 determines that the number of validated second authentication factors that affirm the operation satisfies the predetermined threshold, the server 220 may authorize the operation.

Alternatively, if the server 220 determines that at least one of the validated second authentication factors received rejects the operation or upon determining the number of validated second authentication factors received that affirm the operation fails to satisfy the predetermined threshold, server 220 may deny the operation. In this case, the server 220 may perform a security action. For example, server 220 may flag the request from the computing device 205-a for authorization of the operation, and provide for display the flagged request via a user interface of the computing device 205-a, the computing device 205-b, or the computing device 205-c. The server 220 may also store the flagged request in a database (e.g., database 130) and associate the computing device 205-a with the flagged request. For example, a database may include a table with a number of entries (e.g., fields). The table may record, track, update one or more fields associated with an operation of service, software application, subscription etc. For example, a first field may identify a software application, a second field may identify an operation associated with the software application, a third field may identify one or more computing devices assigned as authorizers of the operation, and a fourth field may indicate a type of security and authorization protocol (e.g., multi-authentication factors) to perform based on the operation.

In some cases, the server 220 may obtain information associated with the failed second authentication factor or the computing device that sent the failed second authentication factor, or both; and similarly provide for display the obtained information to the computing device 205-a, the computing device 205-b, or the computing device 205-c, a predetermined administrator, or any combination thereof. In some cases, the computing devices 205 associated with the second authentication factors may be ranked based on a priority level of an individual associated with the computing device. The priority level may include top-level management member, a middle-level management member, or a low-level management member, or a combination thereof. In this case, the predetermined threshold may include satisfying a number of top-level management members or middle-level management members to affirm the operation.

At 295-a, the server 220 may provide authorization to the computing device 205-a. At block 295-b, the computing device 205-a may perform the operation. The operation, in some examples, may be a digital signing operation associated with at least one of software code or data, or both. Data may include configuration files, web page sources, scripts, and any other data that may be used by the computing device 205-*a* operating system or an application executing and running on the computing device 205-*a*.

According to the techniques described herein, securing and authorizing sensitive operations to protect data and computing devices against malicious program may be provided by securing a first authentication factor (e.g. credentials) associated with a first individual of a first computing device with a number of different individuals second authentication factors (e.g. VIP token). That is, instead of typical 1:1 match between a first authentication factor and a second authentication factor (i.e., software token), the techniques described herein provide multiple second authentication factors associated with a single first authentication factor. As a result, the improved techniques described herein support a 1:N match, where N is a positive integer.

Due to the adapted techniques and implementations imposed by malicious entities (e.g., malware programmers), the above described techniques beneficially provide improvements for securing and authorizing access to sensitive operations by using multiple second authentication factors associated with a single first authentication factor. Furthermore, the techniques described herein provide improvements to the operation of a computing device (e.g., computing devices 205). For example, by mitigating potential risks of malicious entities embedding malware onto a computing device, the operating characteristics may such as central processing unit (CPU) usage and memory usage of the computing device may be conserved. Additionally, the techniques described herein may provide efficiency to the computing device by reducing potential latency associated with encumbered computing devices from infected malware.

Figure 3:
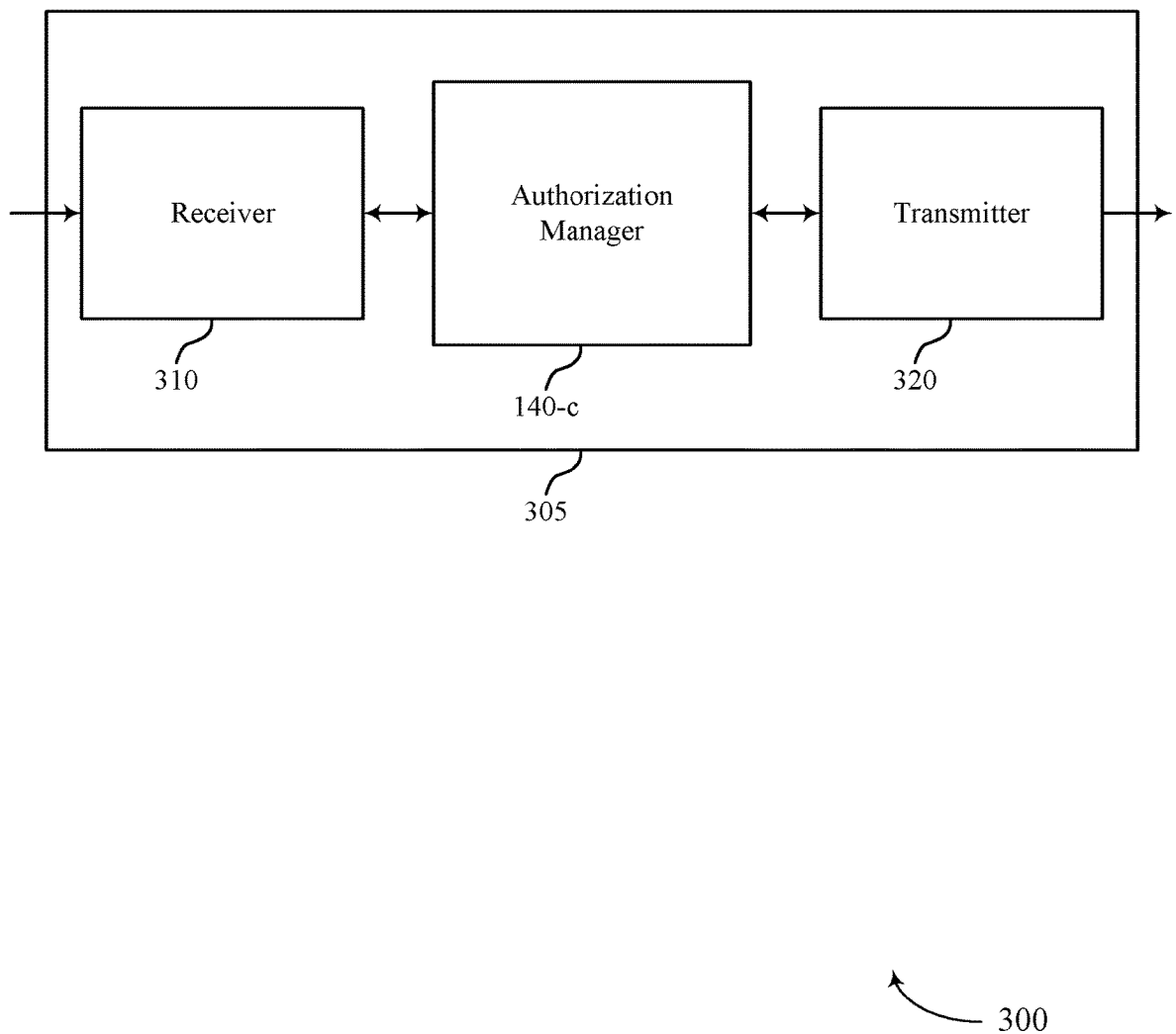
FIGS. 3 through 5 illustrate block diagrams of a computing device that supports securing and authorizing sensitive operations to protect against malicious programs, in accordance with aspects of the present disclosure.

FIG. 3 illustrates a block diagram 300 of a computing device 305 that supports securing and authorizing sensitive operations to protect against malicious programs (e.g., viruses, worms, Trojans, spyware, adware, rootkits), in accordance with aspects of the present disclosure. The computing device 305 may be an example of aspects of device 105 or server 120 as described with reference to FIG. 1. The computing device 305 may include one or more processors. Each of the components of the computing device 305 may be in communication with one another (e.g., via one or more buses).

Receiver 310 may receive request in the form of electronic messages. The electronic messages may include metadata. Receiver 310 may communicate with one or more devices 105 or servers 120 over a network 110 as described with reference to FIG. 1. A received electronic message and components of the electronic message may be passed on to other components of the computing device 305. In some cases, receiver 310 may be an example of aspects of the transceiver 625 described with reference to FIG. 6. The receiver may utilize a single antenna or a set of antennas.

Authorization manager 140-*c* and/or at least some of its various sub-components may be implemented in hardware, software executed by a processor, firmware, or any combination thereof. If implemented in software executed by a processor, the functions of the authorization manager 140-*c* and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The authorization manager 140-*c* and/or at least some of its various sub-components may be physically located at various positions, including being distributed such that portions of functions are implemented at different physical locations by one or more physical devices. In some examples, authorization manager 140-*c* and/or at least some of its various sub-components may be a separate and distinct component in accordance with various aspects of the present disclosure. In other examples, authorization manager 140-*c* and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Authorization manager 140-*c* may receive a first authentication factor from a second computing device based at least in part on a request from the second computing device to authorize an operation; upon validating the first authentication factor, sending to at least the second computing device and a third computing device, a request for a second authentication factor; and authorizing, by the first computing device, the operation based at least in part on validating the second authentication factor from the second computing device or from the third computing device, or from both.

Transmitter 320 may transmit signals generated by other components of the computing device 305. In some examples, the transmitter 320 may be collocated with a receiver 310 in a transceiver module. For example, the transmitter 320 may be an example of aspects of the transceiver 625 described with reference to FIG. 6. The transmitter 320 may utilize a single antenna or a set of antennas.

Figure 4:
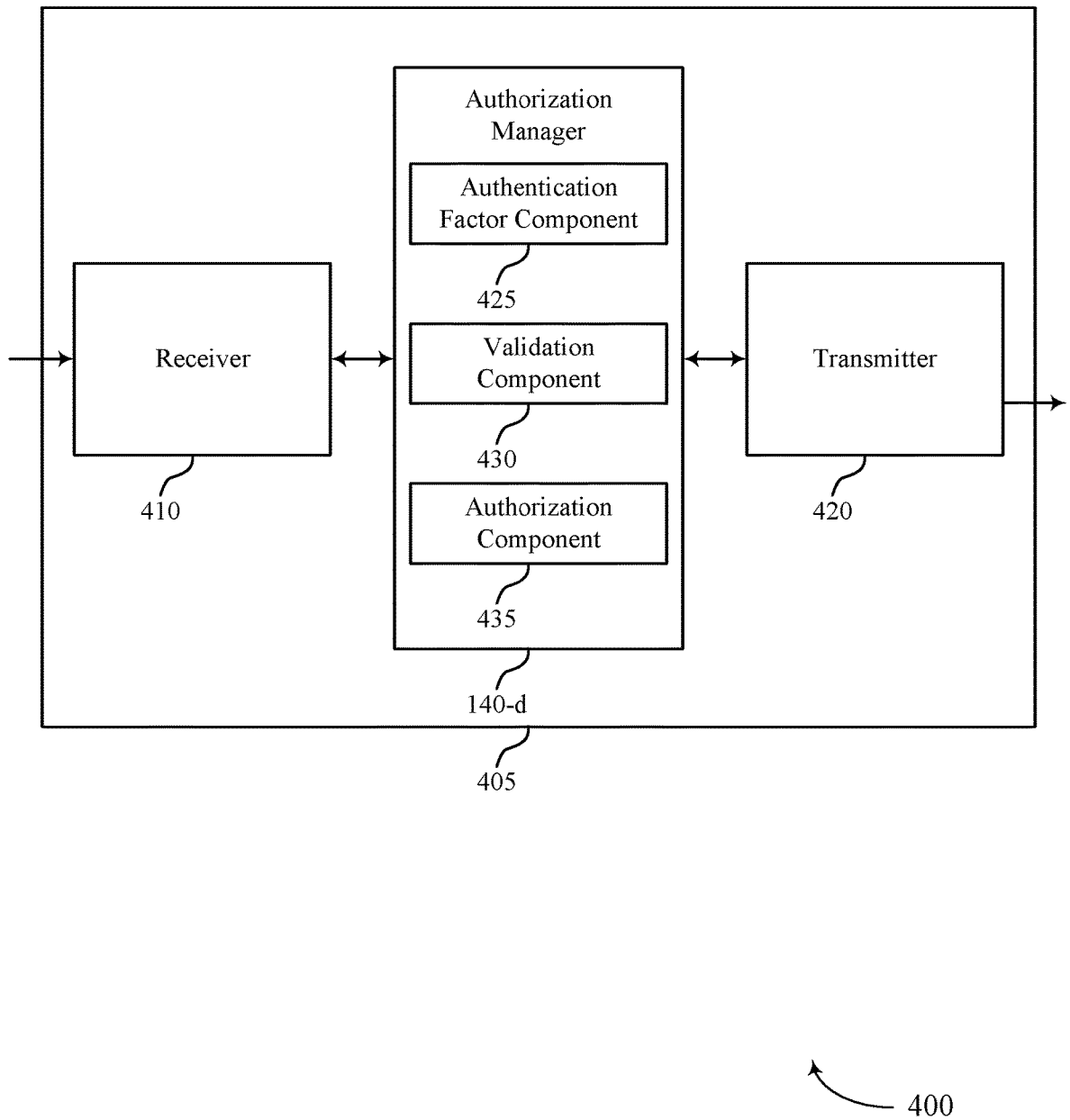

FIG. 4 illustrates a block diagram 400 of a computing device 405 that supports securing and authorizing sensitive operations to protect against malicious programs (e.g., viruses, worms, Trojans, spyware, adware, rootkits), in accordance with aspects of the present disclosure. The computing device 405 may be an example of aspects of device 105 or server 120 as described with reference to FIG. 1. The computing device 405 may include one or more processors. Each of the components of the computing device 405 may be in communication with one another (e.g., via one or more buses).

Receiver 410 may receive request in the form of electronic messages (e.g., emails, short message services (SMS) mobile messages). Receiver 410 may communicate with one or more devices 105 or servers 120 over a network 110 as described with reference to FIG. 1. A received electronic message and components of the electronic message may be passed on to other components of the computing device 405. In some examples, receiver 410 may be an example of aspects of the transceiver 625 described with reference to FIG. 6. The receiver may utilize a single antenna or a set of antennas.

Authorization manager 140-*d* may be an example of aspects of the authorization manager 140 described with reference to FIGS. 1, 3, 5, 6, and 9. Authorization manager 140-*d* may also include an authentication factor component 425, a validation component 430, and an authorization component 435. The authentication factor component 425 may receive a first authentication factor from a second computing device based at least in part on a request from the second computing device to authorize an operation. The validation component 430 may upon validating the first authentication factor, send to at least the second computing device and a third computing device, a request for a second authentication factor. The authorization component 435 may authorize the operation based at least in part on validating the second authentication factor from the second computing device or from the third computing device, or from both.

Transmitter 420 may transmit signals generated by other components of the computing device 405. In some examples, the transmitter 420 may be collocated with a receiver 410 in a transceiver module. For example, the transmitter 420 may be an example of aspects of the transceiver 625 described with reference to FIG. 6. The transmitter 420 may utilize a single antenna or a set of antennas.

Figure 5:
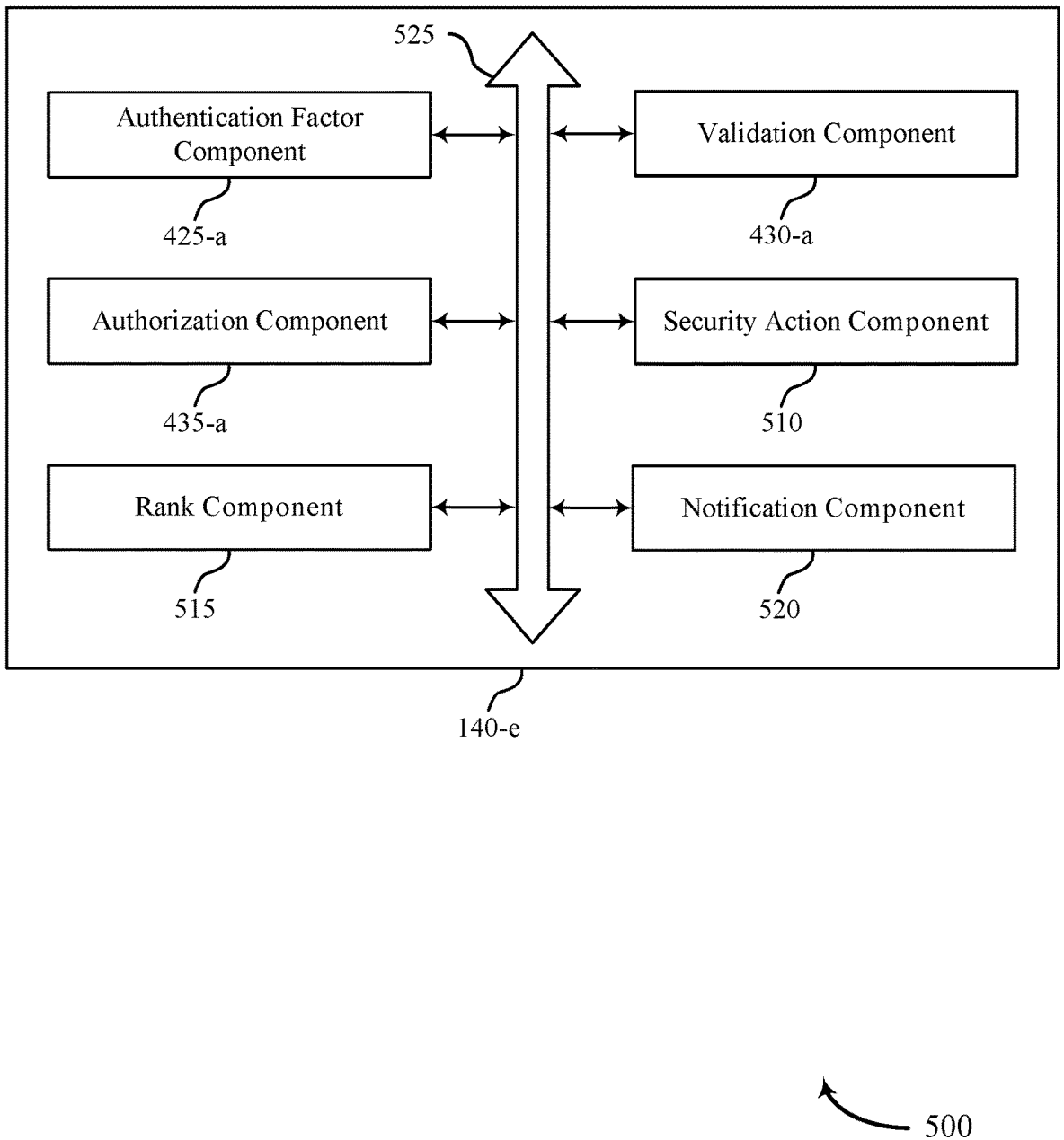

FIG. 5 illustrates a block diagram 500 of an authorization manager 140-e that supports securing and authorizing sensitive operations to protect against malicious programs (e.g., viruses, worms, Trojans, spyware, adware, rootkits), in accordance with aspects of the present disclosure. The authorization manager 140-e may be an example of aspects of an authorization manager 140 described with reference to FIGS. 1, 3, 4, 6, or 9. The authorization manager 140-e may include a authentication factor component 425-a, a validation component 430-a, an authorization component 435-a, a security action component 510, a rank component 515, and a notification component 520. Each of these components may communicate, directly or indirectly, with one another (e.g., via bus 525).

Authentication factor component 425-a may be an example of aspects of authentication factor component 425 described with reference to FIG. 4. Authentication factor component 425-a may receive a first authentication factor from a second computing device based at least in part on a request from the second computing device to authorize an operation. In some examples, the first authentication factor or the second authentication factor or both include at least one of a knowledge factor, a possession factor, a disconnected token, a connected token, or an inherence factor, or any combination thereof. In some examples, the operation may be associated with at least one of access to a user account, access to a bank account, access to a trust fund, access to an inheritance, access to a service, access to a software application, access to a subscription, access to software code, access to firmware code, access to hardware code, access to remote procedure call middleware, access to database middleware, access to transaction middleware, access to embedded middleware, access to content-centric middleware, or any combination thereof. In some examples, the operation may include at least one of a digital signing operation associated with at least one of software code or data, or both.

Validation component 430-a may be an example of aspects of validation component 430 described with reference to FIG. 4. Validation component 430-a may validate the first authentication factor. Upon validating the first authentication factor, validation component 430-a may send to at least the second computing device and a third computing device, a request for a second authentication factor. In some examples, the second authentication factor may be sent to two or more computing devices associated with a certain number of individuals predetermined as authorizers of the operation. The two or more computing devices may include the second computing device and the third computing device.

Authorization component 435-a may be an example of aspects of authorization component 435 described with reference to FIG. 4. Authorization component 435-a may authorize the operation based at least in part on validating the second authentication factor from the second computing device or from the third computing device, or from both. Authorization component 435-a may identify how many validated second authentication factors affirm the operation; and determine whether the number of validated second authentication factors that affirm the operation satisfies a predetermined threshold. In some embodiments, authorization component 435-a may upon determining the number of validated second authentication factors that affirm the operation satisfies the predetermined threshold, authorize the operation. Alternatively, authorization component 435-a may upon determining at least one of the validated second authentication factors received rejects the operation or upon determining the number of validated second authentication factors received that affirm the operation fails to satisfy the predetermined threshold, deny the operation. Authorization component 435-a may validate each second authentication factor received from the two or more computing device; and determine whether a response sent with each received second authentication factor indicates an affirmative response to permit the operation or indicates a rejection response to deny the operation.

Security action component 510 may upon determining at least one of the second authentication factors received from the two or more computing devices fails validation, perform a security action based at least in part on the determining. In some examples, security action component 510 may obtain information associated with the failed second authentication factor or the computing device that sent the failed second authentication factor, or both; and provide for display the obtained information to the first computing device, at least one of the two or more computing devices, a predetermined administrator, or any combination thereof.

Rank component 515 may rank the two or more computing devices based at least in part on a priority level associated with each of the two or more computing devices or an individual associated with each of the two or more computing devices, or both. Notification component 520 may upon determining at least one of the validated second authentication factors rejects the operation, send a denial notification to at least one of first computing devices, at least one of the two or more computing devices, or any combination thereof.

Figure 6:
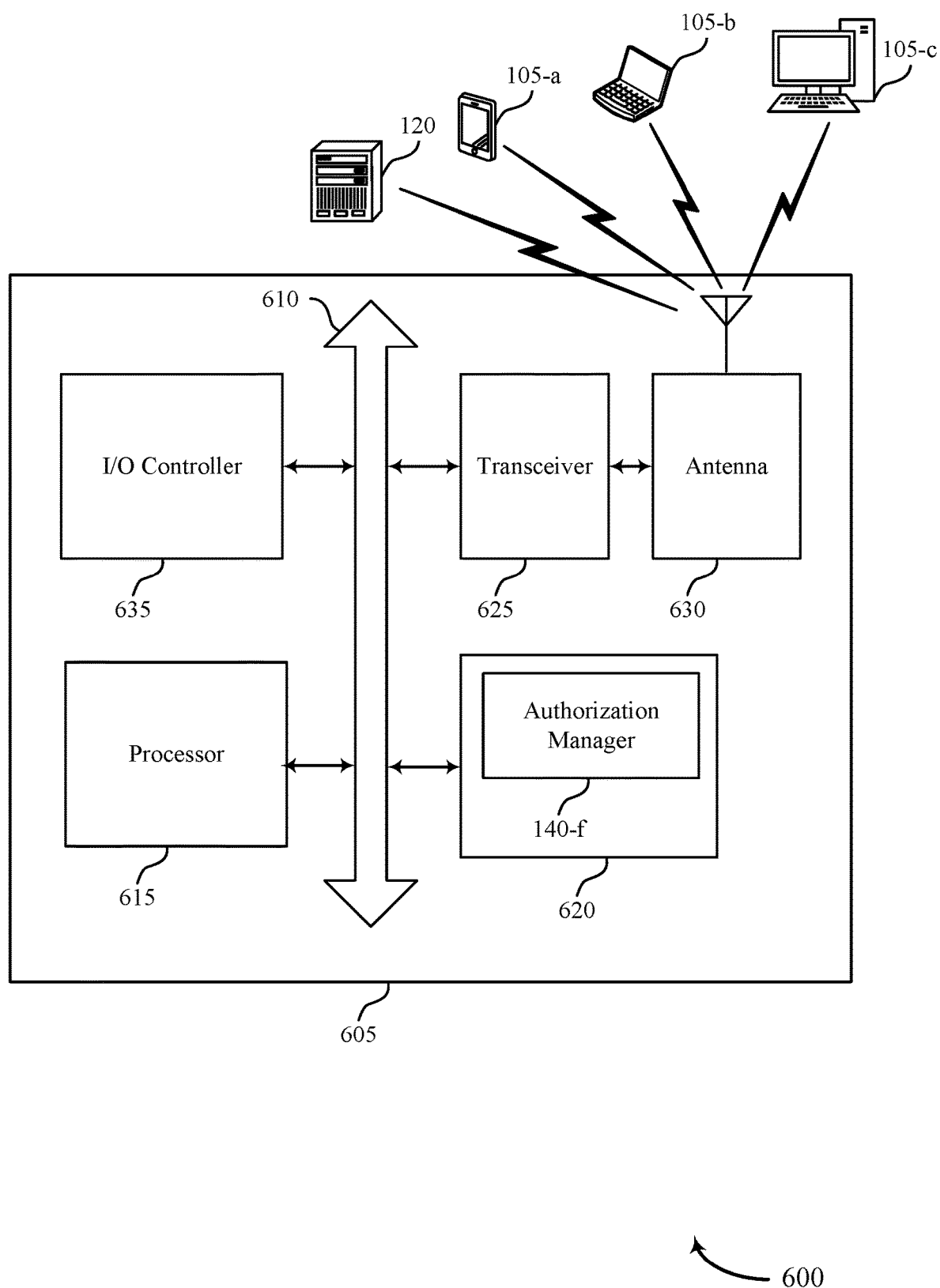
FIG. 6 illustrates block diagram of a system including a computing device that supports securing and authorizing sensitive operations to protect against malicious programs, in accordance with aspects of the present disclosure.

FIG. 6 illustrates a block diagram of a system 600 including a computing device 605 that supports securing and authorizing sensitive operations to protect against malicious programs (e.g., viruses, worms, Trojans, spyware, adware, rootkits), in accordance with aspects of the present disclosure. The computing device 605 may be an example of the device 105 or the server 120 and its components as described herein. The system 600 may also include the server 120, the device 105-a, the device 105-b, and the device 105-c, which may be an example of server 120 or device 105 as described with reference to FIG. 1.

The computing device 605 may include a bus 610 which interconnects major subsystems of the computing device 605, such as one or more processors 615, a system memory 620 (read-only memory (ROM) or flash memory (neither shown), and random access memory (RAM) (not shown), flash RAM, or the like), an I/O controller 635, a transceiver 625, and an antenna 630.

The processor 615 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 615 may be configured to operate a memory array using a memory controller. In other cases, a memory controller may be integrated into the processor 615. The processor 615 may be configured to execute computer-readable instructions stored in a memory to perform various functions (e.g., functions or tasks supporting securing and authorizing sensitive operations to protect against malicious programs).

The bus 610 may allow data communication between the processor 615 and the system memory 620, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) or a Unified Extensible Firmware Interface (UEFI), which controls basic hardware operation such as the interaction with peripheral components or devices. For example, authorization manager 140-f, to implement the present techniques, may be stored within the system memory 620. The system memory 620 may store computer-readable, computer-executable software including instructions that, when executed, cause the processor to perform various functions described herein. In some cases, the system memory 620 may contain, among other things, a BIOS which may control basic hardware or software operation such as the interaction with peripheral components or devices.

Authorization manager 140-f may be an example of the authorization manager 140 depicted and described in FIGS. 1, 3 through 5, or 9. The authorization manager 140-f may receive a first authentication factor from a computing device based on a request from the computing device to authorize an operation; upon validating the first authentication factor, send to at least one or more other computing devices a request for a second authentication factor; and authorize the operation based on validating the second authentication factor from the one or more other computing devices. The operation, in some examples, may be a digital signing operation associated with at least one of software code or data, or both. Data may include configuration files, web page sources, scripts, and any other data that may be used by a computing device operating system or an application executing and running on the computing device.

A digital signing operation may be sensitive because of using a private key to perform the digital signing operation. That is, digitally signing software code, firmware code, hardware code, data, or any combination thereof using a private key may be an indication that a computing device using the private key is the authentic source of the private key, and that the software code, the firmware code, the hardware code, the data, or any combination has not been tampered (e.g., infected with malware) since the digital signing operation. In some cases, the operation may be a firmware signing operation including executable code and data. For example, firmware code to a router may be signed as a set of data that includes executable code and data. The firmware code may be a combination of all code and data that encompasses an operating system and the environment a computing device is running in. Data may include configuration files, web page sources, scripts, etc.

Applications resident within the computing device 605 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

The transceiver 625 may communicate bi-directionally, via one or more antennas, wired, or wireless links as described above. For example, the transceiver 625 may represent a wireless transceiver and may communicate bi-directionally with another wireless transceiver. In some cases, the computing device 605 may include a single antenna 630. However, in some cases the computing device 605 may have more than one antenna 630, which may be capable of concurrently transmitting or receiving multiple wireless transmissions.

Figure 7:
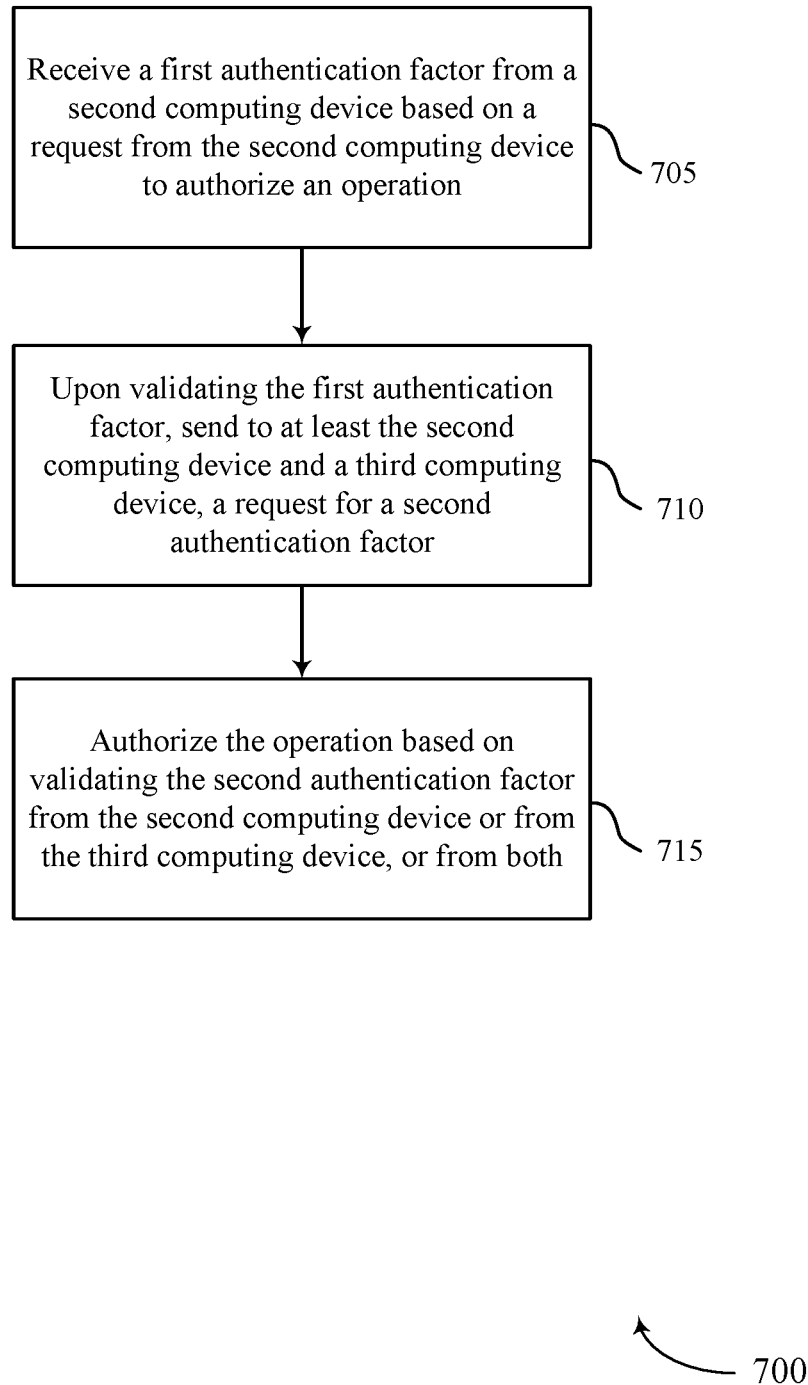
FIG. 7 illustrates a method for securing and authorizing sensitive operations, in accordance with aspects of the present disclosure.

FIG. 7 shows a flowchart illustrating a method 700 for securing and authorizing sensitive operations, in accordance with aspects of the present disclosure. The operations of method 700 may be implemented by server 120 or its components described herein. For example, the operations of method 700 may be performed by an authorization manager as described with reference to FIGS. 1, 3 through 6, 9, and 10. In some embodiments, the operations of method 700 may be implemented by device 105 (e.g., device 105-a, device 105-b, or device 105-c, or any combination thereof) or its components described herein.

In some examples, device 105 or server 120 may execute a set of codes to control the functional elements of the device 105 or the server 120 to perform the functions described below. Additionally or alternatively, the device 105 or the server 120, or both may perform aspects of the functions described below using special-purpose hardware. In some configurations, the method 700 may be implemented in conjunction with application 110 as described with reference to FIG. 1. In the following description of the method 700, the operations may be performed in a different order than the exemplary order shown. Certain operations may also be left out of the method 700, or other operations may be added to the method 700.

At block 705, the server 120 may receive a first authentication factor from a computing device (e.g., device 105-a) based on a request from the computing device to authorize an operation. The operations of block 705 may be performed according to the methods described herein. In certain examples, aspects of the operations of block 705 may be performed by an authentication factor component as described with reference to FIGS. 4 and 5.

The first authentication factor may be a knowledge factor, a possession factor, a disconnected token, a connected token, or an inherence factor. The knowledge factor may be a category of authentication credentials including information that an individual of the computing device (e.g., device 105-a) possess. For example, the knowledge factor may be a personal identification number (PIN), a user name and a password, or an answer to a secret question. The possession factor may be another example of a category of authentication credentials based on an item carried by the individual of the computing device. The item may be a physical hardware device (e.g., a security token or a mobile phone used in conjunction with a software token). The inherence factor may be another example of a category of authentication credentials including elements (e.g., biometric data) that are integral to the individual of the computing device.

In some examples, server 120 may receive the request from the computing device to authorize the operation before receiving the first authentication factor. For example, upon receiving the request from the computing device, server 120 may transmit a request to the computing device requesting the first authentication factor (e.g., PIN or an answer to a secret question), which the computing device may provide. Server 120 may validate the received first authentication factor from the computing device. For example, server 120 may validate the first authentication factor by comparing the first authentication factor to stored information (e.g., stored authentication factor) in a database (e.g., database 130).

At block 710, upon validating the first authentication factor, server 120 may send to at least the computing device and another computing device, a request for a second authentication factor. The operations of block 710 may be performed according to the methods described herein. In certain examples, aspects of the operations of block 710 may be performed by an authentication factor component and a validation component as described with reference to FIGS. 4 and 5.

The second authentication factor may include a knowledge factor, a possession factor, a disconnected token, a connected token, or an inherence factor. The second authentication factor may also be a notification including an option for an individual of the computing device to select and respond to the request to authorize the operation. For example, the notification may be an e-mail, a short message service (SMS), an enhanced message service (EMS), a multimedia message service (MMS), an instant messaging notification associated with an instant message application running on the computing device, a handheld device markup language (HDML) notification, a voicemail, etc. providing an option for an individual to permit or reject the operation.

In some cases, the second authentication factor may be sent by server 120 to two or more computing devices associated with a certain number of individuals predetermined as authorizers of the operation. Server 120 may also request same or different types of second authentication factors from different computing devices. For example, server 120 may request a knowledge factor from one computing device associated with an individual assigned as an authorizer of the operation, a disconnected token from a second computing device associated with a second individual assigned as the authorizer of the operation, a connected token from a third computing device associated with a third individual assigned as the authorizer of the operation, etc. By providing second authentication factors to additional computing devices and individuals, server 120 may allow securing of a sensitive operation by validating a first authentication factor (e.g., credentials) with a plurality of different individual's second authentication factor (e.g., VIP token). Server 120 may secure and authorize sensitive operations based on the second authentication factor. The operation associated with the request from the computing device may be a sensitive operation such as e.g., signing of code, updates, and firmware that often performed within automated builds. Techniques for better securing automated access to sensitive operations may be provided by method 700.

At block 715, server 120 may authorize the operation based on validating the second authentication factor from the computing device (e.g., device 105-*a*) or from the other computing device (e.g., device 105-*b* or device 105-*c*), or from both. The operations of block 715 may be performed according to the methods described herein. In certain examples, aspects of the operations of block 715 may be performed by an authorization component and a validation component as described with reference to FIGS. 4 and 5.

Figure 8A:
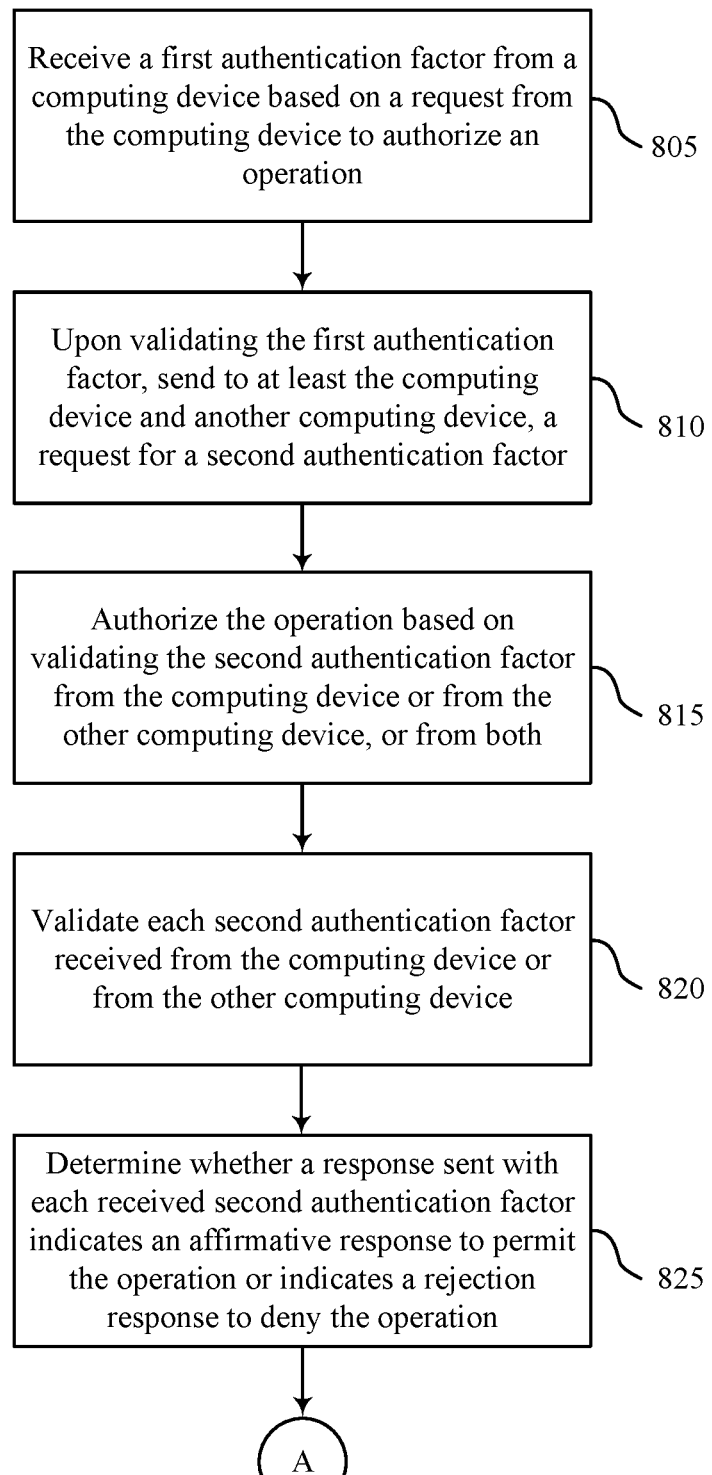
FIGS. 8A and 8B illustrate a method for securing and authorizing sensitive operations, in accordance with aspects of the present disclosure.
Figure 8B:
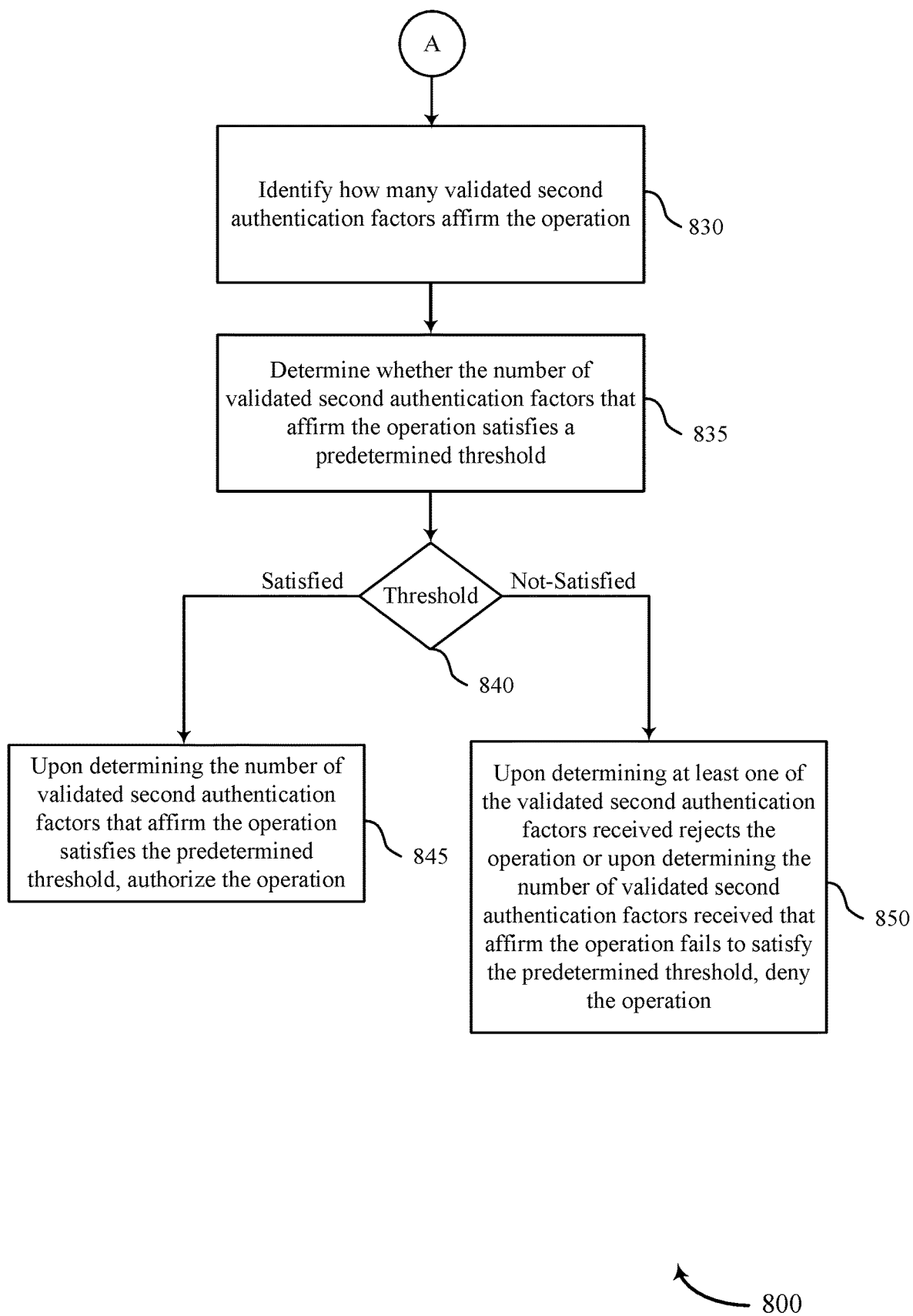

FIGS. 8*a* and 8*b* shows a flowchart illustrating a method 800 for securing and authorizing sensitive operations, in accordance with aspects of the present disclosure. The operations of method 800 may be implemented by server 120 or its components described herein. For example, the operations of method 800 may be performed by an authorization manager as described with reference to FIGS. 1, 3 through 6, 9, and 10. In some embodiments, the operations of method 800 may be implemented by device 105 (e.g., device 105-*a*, device 105-*b*, or device 105-*c*, or any combination thereof) or its components described herein. In some examples, device 105 or server 120 may execute a set of codes to control the functional elements of the device 105 or the server 120 to perform the functions described below. Additionally or alternatively, the device 105 or the server 120, or both may perform aspects of the functions described below using special-purpose hardware. In some configurations, the method 800 may be implemented in conjunction with application 110 as described with reference to FIG. 1. In the following description of the method 800, the operations may be performed in a different order than the exemplary order shown. Certain operations may also be left out of the method 800, or other operations may be added to the method 800.

At block 805, the server 120 may receive a first authentication factor from a computing device (e.g., device 105-*a*) based on a request from the computing device to authorize an operation. For example, device 105-*a* may provide a first authentication factor to the server 120 via communication link 155. The first authentication factor may be a knowledge factor, a possession factor, a disconnected token, a connected token, or an inherence factor. The knowledge factor may be a category of authentication credentials including information that an individual of the computing device (e.g., device 105-*a*) possess. For example, the knowledge factor may be a personal identification number (PIN), a user name and a password, or an answer to a secret question.

The possession factor may be another example of a category of authentication credentials based on an item carried by the individual of the computing device. The item may be a physical hardware device (e.g., a security token or a mobile phone used in conjunction with a software token). The inherence factor may be another example of a category of authentication credentials including elements (e.g., biometric data) that are integral to the individual of the computing device. The biometric data may include samples, models, fingerprints, body characteristics, voice patterns, facial patterns, similarity scores and all verification or identification data excluding the individual's name and demographics.

In some examples, server 120 may receive the request from the computing device to authorize the operation before receiving the first authentication factor. For example, upon receiving the request from the computing device, server 120 may transmit a request to the computing device requesting the first authentication factor (e.g., PIN or an answer to a secret question), which the computing device may provide. Server 120 may validate the received first authentication factor from the computing device. For example, server 120 may validate the first authentication factor by comparing the first authentication factor to stored information (e.g., stored authentication factor) in a database (e.g., database 130). If a match exists, server 120 may confirm the request and continue the process of authorizing the request. However, if a match does not exist, server 120 may prompt the computing device to re-submit the first authentication factor. For example, server 120 may provide to the computing device a notification for display indicating that the provided first authentication factor could not be validated and to please re-provide the authentication factor.

The operations of block 805 may be performed according to the methods described herein. In certain examples, aspects of the operations of block 805 may be performed by an authentication factor component as described with reference to FIGS. 4 and 5.

At block 810, upon validating the first authentication factor, server 120 may send to at least the computing device and another computing device, a request for a second authentication factor. The second authentication factor may also include a knowledge factor, a possession factor, a disconnected token, a connected token, or an inherence factor. Additionally or alternatively, the second authentication factor may be a message including an option for the individual of the computing device to select and respond to the request to authorize the operation. For example, the message may be a dialogue box with an option for an individual to permit or reject the operation.

In some cases, the second authentication factor may be sent by server 120 to two or more computing devices associated with a certain number of individuals predetermined as authorizers of the operation. Server 120 may also request same or different types of second authentication factors from different computing devices. For example, server 120 may request a knowledge factor from one computing device associated with an individual assigned as an authorizer of the operation, a possession factor from a second computing device associated with a second individual assigned as the authorizer of the operation, an inherence factor from a third computing device associated with a third individual assigned as the authorizer of the operation, etc. As such, server 120 may allow securing of a first authentication factor (e.g., credentials) with a plurality of different individual's second authentication factor (e.g., VIP token). In some embodiments, server 120 may configure as to whether any explicit denial causes failure and how many of the second authentication factors are required to be completed before the authentication is considered to be authorized.

Server 120 may secure and authorize sensitive operations based on the second authentication factor. The operation associated with the request from the computing device may be a sensitive operation such as e.g., signing of code, updates, and firmware that often performed within automated builds. In this scenario, processes and system calls to services that perform a sensitive operation may be gated and secured by requiring a certificate or other form of credentials (e.g., a first authentication factor from the computing device and a second authentication factor from the computing device and a number of alternative computing devices). In some examples, an automated build process may fetch credentials to authenticate with such services in order to request the sensitive operation. However, automated build processes are often not well secured, so the credentials they use are also not well secured and are at risk of compromise. Techniques for better securing automated access to sensitive operations may be provided by method 800.

The operations of block 810 may be performed according to the methods described herein. In certain examples, aspects of the operations of block 810 may be performed by an authentication factor component and a validation component as described with reference to FIGS. 4 and 5.

At block 815, server 120 may authorize the operation based on validating the second authentication factor from the computing device (e.g., device 105-a) or from the other computing device (e.g., device 105-b or device 105-c), or from both. The operations of block 815 may be performed according to the methods described herein. In certain examples, aspects of the operations of block 815 may be performed by an authorization component and a validation component as described with reference to FIGS. 4 and 5.

At block 820, server 120 may validate each second authentication factor received from the computing device (e.g., device 105-a) or from the other computing device (e.g., device 105-b or device 105-c). In the example that the second authentication factor is associated with a message providing an option for an individual to permit or reject the operation, server 120 may track a number of permitted and rejected indications as part of validating each second authentication factor received. In another scenario, server 120 may validate the second authentication factor (e.g., the knowledge factor from one computing device, the possession factor from the second computing device, and the inherence factor from the third computing device) by comparing each second authentication factor to stored information (e.g., stored authentication factors) in a database (e.g., database 130). The operations of block 820 may be performed according to the methods described herein. In certain examples, aspects of the operations of block 820 may be performed by a validation component as described with reference to FIGS. 4 and 5.

At block 825, server 120 may determine whether a response sent with each received second authentication factor indicates an affirmative response to permit the operation or indicates a rejection response to deny the operation. As provided above, server 120 may track and record a number of received permitted and rejected indications from the computing devices. The operations of block 825 may be performed according to the methods described herein. In certain examples, aspects of the operations of block 825 may be performed by an authorization component as described with reference to FIGS. 4 and 5.

At block 830, server 120 may identify how many validated second authentication factors affirm the operation. For example, server 120 may track a number of second authentication factors affirming the operation using a counter, which the server 120 may increment each time a second authentication factor is received affirming the operation. The operations of block 830 may be performed according to the methods described herein. In certain examples, aspects of the operations of block 830 may be performed by an authorization component as described with reference to FIGS. 4 and 5.

At block 835, server 120 may determine whether the number of validated second authentication factors that affirm the operation satisfies a predetermined threshold. The predetermined threshold may include a number or a percentage of second authentication factors affirming the operation. In some cases, the computing devices associated with the second authentication factors may be ranked based on a priority level of an individual associated with the computing device. The priority level may include top-level management member, a middle-level management member, or a low-level management member, or a combination thereof. In this case, the predetermined threshold may include satisfying a number of top-level management members or middle-level management members to affirm the operation. The operations of block 835 may be performed according to the methods described herein. In certain examples, aspects of the operations of block 835 may be performed by an authorization component as described with reference to FIGS. 4 and 5.

At block 840, server 120 may determine whether the predetermined threshold is satisfied or not satisfied. The operations of block 840 may be performed according to the methods described herein. In certain examples, aspects of the operations of block 840 may be performed by an authorization component as described with reference to FIGS. 4 and 5. If server 120 determines that the number of validated second authentication factors that affirm the operation satisfies the predetermined threshold, at block 845 server 120 may authorize the operation. Alternatively, if server 120 determines that at least one of the validated second authentication factors received rejects the operation or upon determining the number of validated second authentication factors received that affirm the operation fails to satisfy the predetermined threshold, server 120 may deny the operation. The operations of blocks 845 and 850 may be performed according to the methods described herein. In certain examples, aspects of the operations of blocks 845 and 850 may be performed by an authorization component as described with reference to FIGS. 4 and 5.

It should be noted that the methods described above describe possible implementations, and that the operations and the steps may be rearranged or otherwise modified and that other implementations are possible. Further, aspects from two or more of the methods may be combined.

Figure 9:
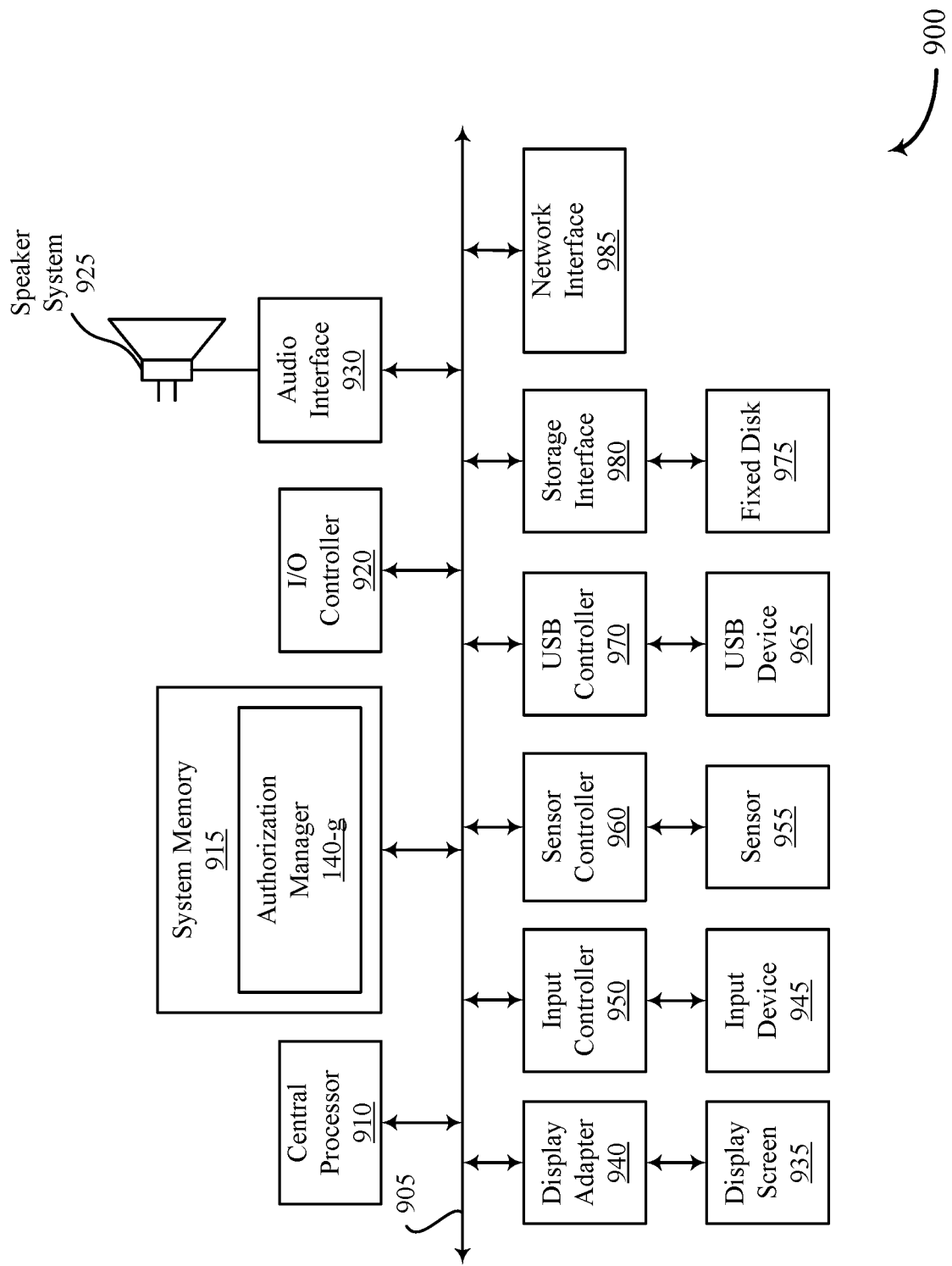
FIG. 9 illustrates a block diagram of a computer system that supports securing and authorizing sensitive operations, in accordance with aspects of the present disclosure.

FIG. 9 illustrates a block diagram of a computer system 900 that supports securing and authorizing sensitive operations to protect against malicious programs (e.g., viruses, worms, Trojans, spyware, adware, rootkits), in accordance with aspects of the present disclosure. The computer system 900 may be an example of device 105 or server 120 as described with reference to FIG. 1. In one embodiment, computer system 900 may include a bus 905 which interconnects major subsystems of computer system 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include ROM or flash memory (neither shown), and RAM (not shown), as previously noted. The RAM is generally the main memory into which the operating system and application programs are loaded. The ROM or flash memory can contain, among other code, the BIOS or the UEFI, which controls basic hardware operation such as the interaction with peripheral components or devices. For example, the authorization manager 140-*g*, to implement the present techniques, may be stored within the system memory 915. Applications (e.g., applications 110) resident with computer system 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of computer system 900, can connect to a standard computer readable medium for storage and/or retrieval of information, such as a fixed disk drive 975. Fixed disk drive 975 may be a part of computer system 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present techniques. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 915 or fixed disk 975. The operating system provided on computer system 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computer system 900 may include wireless communication signals such as radio frequency, electromagnetics, local area network (LAN), wide area network (WAN), metropolitan area network (MAN), virtual private network (VPN), wireless network (using 802.11, for example), cellular network (using 3G, LTE, next generation 5G new radio (NR) for example), and/or other signals. The network interface 985 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 920 may operate in conjunction with network interface 1085 and/or storage interface 980. The network interface 985 may enable system 900 with the ability to communicate with client devices (e.g., device 105 of FIG. 1), and/or other devices over the network 110 of FIG. 1. Network interface 985 may provide wired and/or wireless network connections. In some cases, network interface 985 may include an Ethernet adapter or Fiber Channel adapter. Storage interface 980 may enable system 900 to access one or more data storage devices. The one or more data storage devices may include two or more data tiers each. The storage interface 980 may include one or more of an Ethernet adapter, a Fiber Channel adapter, Fiber Channel Protocol (FCP) adapter, a SCSI adapter, and iSCSI protocol adapter.

Figure 10:
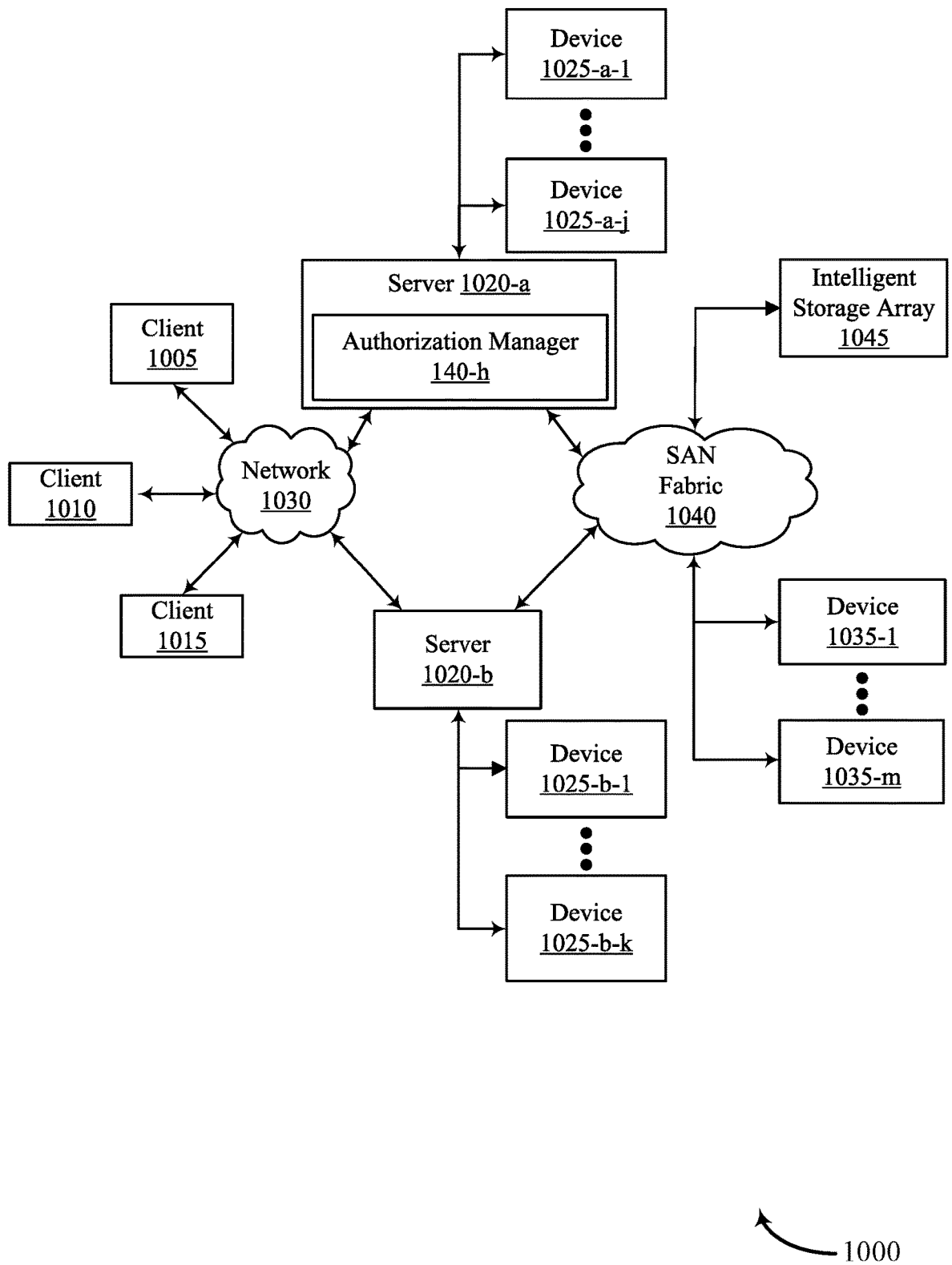
FIG. 10 illustrates a block diagram of a network architecture in which client systems and storage servers may be coupled to a network, in accordance with one or more aspects of the present disclosure.

FIG. 10 illustrates a block diagram of a network architecture 1000 in which client systems and storage servers may be coupled to a network, in accordance with one or more aspects of the present disclosure. In the network architecture 1000, client systems 1005, 1010, and 1015, and storage servers 1020-*a* and 1020-*b* may be coupled to a network 1030, in accordance with one or more aspects of the present disclosure. In one embodiment, the authorization manager 140-*h* may be located within one of the storage servers 1020-*a* and 1020-*b* to implement the present techniques. The authorization manager 140-*h* may be one example of authorization manager 140 depicted and described in FIGS. 1, 3 through 6, or 9.

The authorization manager 140-*h* may receive a first authentication factor from a computing device based on a request from the computing device to authorize an operation; upon validating the first authentication factor, send to at least one or more other computing devices a request for a second authentication factor; and authorize the operation based on validating the second authentication factor from the one or more other computing devices. The operation, in some examples, may be a digital signing operation associated with at least one of software code or data, or both. Data may include configuration files, web page sources, scripts, and any other data that may be used by a computing device operating system or an application executing and running on the computing device.

A digital signing operation may be sensitive because of using a private key to perform the digital signing operation. That is, digitally signing software code, firmware code, hardware code, data, or any combination thereof using a private key may be an indication that a computing device using the private key is the authentic source of the private key, and that the software code, the firmware code, the hardware code, the data, or any combination has not been tampered (e.g., infected with malware) since the digital signing operation. In some cases, the operation may be a firmware signing operation including executable code and data. For example, firmware code to a router may be signed as a set of data that includes executable code and data. The firmware code may be a combination of all code and data that encompasses an operating system and the environment a computing device is running in. Data may include configuration files, web page sources, scripts, etc.

The storage server 1020-*a* is further depicted as having storage devices 1025-*a*-1 through 1025-*a*-*j* directly attached, and storage server 1020-*b* is depicted with storage devices 1025-*b*-1 through 1025-*b*-*k* directly attached. SAN fabric 1040 supports access to storage devices 1035-1 through 1035-*m* by storage servers 1020-*a* and 1020-*b*, and so by client systems 1005, 1010, and 1015 via network 1030. Intelligent storage array 1045 is also shown as an example of a specific storage device accessible via SAN fabric 1040. With reference to computer system 1000, network interface 1085 or some other means or method can be used to provide connectivity from each of client computer systems 1005, 1010, and 1015 to network 1030. With reference to computer system 600, transceiver 625 or some other means or method can be used to provide connectivity from each of client computer systems 1005, 1010, and 1015 to network 1030. Client systems 1005, 1010, and 1015 are able to access information on storage server 1020-*a* or 1020-*b* using, for example, a web browser or other client software (not shown). Such a client allows client systems 1005, 1010, and 1015 to access data hosted by storage server 1020-*a* or 1020-*b* or one of storage devices 1025-*a*-1 through 1025-*a*-*j*, 1025-*b*-1 through 1025-*b*-*k*, 1035-1 through 1035-*m*, or intelligent storage array 1045. FIG. 10 depicts the use of a network such as the Internet for exchanging data, but the present techniques are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may configure a computing system to perform one or more of the exemplary embodiments disclosed herein.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present techniques and their practical applications, to thereby enable others skilled in the art to best utilize the present techniques and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for securing and authorizing operations, the method being performed by one or more computing devices comprising at least one processor, the method comprising:
   receiving, at a first computing device, a request from a second computing device to authorize an operation;
   transmitting, by the first computing device and to the second computing device, a request for a first authentication factor based at least in part on receiving the request from the second computing device to authorize the operation;
   receiving, at the first computing device associated with a first individual, the first authentication factor from the second computing device based at least in part on transmitting the request for the first authentication factor;
   validating, by the first computing device, the received first authentication factor;
   sending, by the first computing device and in response to validating the first authentication factor, a plurality of requests for a second authentication factor, the plurality of requests comprising a first request for the second authentication factor to the second computing device and a second request for the second authentication factor to a third computing device and a fourth computing device, wherein the second computing device is associated with a second individual, the third computing device is associated with a third individual, and the fourth computing device is associated with a fourth individual;
   receiving the second authentication factor from the second computing device, the third computing device, and the fourth computing device, the second authentication factor different than the first authentication factor; and
   authorizing, by the first computing device, the operation based at least in part on validating the second authentication factor received from the second computing device, the third computing device, and the fourth computing device.

2. The method of claim 1, wherein the first authentication factor or the second authentication factor or both include at least one of a knowledge factor, a possession factor, a disconnected token, a connected token, or an inherence factor, or any combination thereof.

3. The method of claim 1, wherein the second authentication factor is sent to three or more computing devices associated with a certain number of individuals predetermined as authorizers of the operation, the three or more computing devices including the second computing device, the third computing device, and the fourth computing device.

4. The method of claim 3, wherein authorizing the operation is based at least in part on:
   validating each second authentication factor received from the three or more computing devices; and
   determining whether a response sent with each received second authentication factor indicates an affirmative response to permit the operation or indicates a rejection response to deny the operation.

5. The method of claim 1, further comprising:
   identifying a number of validated second authentication factors that affirm the operation; and determining whether the number of validated second authentication factors that affirm the operation satisfies a predetermined threshold, wherein authorizing the operation is based at least in part on the satisfied predetermined threshold.

6. The method of claim 5, further comprising:
upon determining the number of validated second authentication factors that affirm the operation satisfies the predetermined threshold, authorizing the operation; and
upon determining at least one of the number of validated second authentication factors received rejects the operation or upon determining the number of validated second authentication factors received that affirm the operation fails to satisfy the predetermined threshold, denying the operation.

7. The method of claim 4, further comprising:
upon determining at least one of the validated second authentication factors rejects the operation, sending a denial notification to at least one of the first computing device, at least one of the three or more computing devices, or any combination thereof.

8. The method of claim 4, further comprising:
upon determining at least one second authentication factors received from the three or more computing devices fails validation, performing a security action based at least in part on the determining.

9. The method of claim 8, wherein performing the security action further comprises:
obtaining information associated with the at least one failed second authentication factor or a computing device that sent the at least one failed second authentication factor, or both; and
providing for display the obtained information to the first computing device, at least one of the three or more computing devices, a predetermined administrator, or any combination thereof.

10. The method of claim 3, further comprising:
ranking the three or more computing devices based at least in part on a priority level associated with each of the three or more computing devices or an individual associated with each of the three or more computing devices, or both.

11. The method of claim 1, wherein the operation is associated with at least one of access to a user account, access to a bank account, access to a trust fund, access to an inheritance, access to a service, access to a software application, access to a subscription, access to software code, access to firmware code, access to hardware code, access to remote procedure call middleware, access to database middleware, access to transaction middleware, access to embedded middleware, access to content-centric middleware, or any combination thereof.

12. The method of claim 1, wherein the operation comprises at least one of a digital signing operation associated with at least one of software code or data, or both.

13. A computing device configured for securing and authorizing operations, further comprising:
one or more processors; and
memory in electronic communication with the one or more processors, wherein the memory stores computer executable instructions that when executed by the one or more processors cause the one or more processors to:
receive a request from a second computing device to authorize an operation;
transmit, to the second computing device, a request for a first authentication factor based at least in part on receiving the request from the second computing device to authorize the operation;
receive the first authentication factor associated with a first individual from the second computing device based at least in part on transmitting the request for the first authentication factor;
validating the received first authentication factor;
send, in response to validating the first authentication factor, a plurality of requests for a second authentication factor, the plurality of requests comprising a first request for the second authentication factor to the second computing device and a second request for the second authentication factor to a third computing device and a fourth computing device, wherein the second computing device is associated with a second individual, the third computing device is associated with a third individual, and the fourth computing device is associated with a fourth individual;
receive the second authentication factor from the second computing device, the third computing device, and the fourth computing device, the second authentication factor different than the first authentication factor; and
authorize the operation based at least in part on validating the second authentication factor received from the second computing device, the third computing device, and the fourth computing device.

14. The computing device of claim 13, wherein the first authentication factor or the second authentication factor or both include at least one of a knowledge factor, a possession factor, a disconnected token, a connected token, or an inherence factor, or any combination thereof.

15. The computing device of claim 13, wherein the second authentication factor is sent to three or more computing devices associated with a certain number of individuals predetermined as authorizers of the operation, the three or more computing devices including the second computing device, the third computing device, and the fourth computing device.

16. The computing device of claim 15, wherein the instructions for authorizing the operation are further executable by the one or more processors to:
validate each second authentication factor received from the three or more computing devices; and
determine whether a response sent with each received second authentication factor indicates an affirmative response to permit the operation or indicates a rejection response to deny the operation.

17. A non-transitory computer-readable medium storing computer executable instructions that when executed by one or more processors of a first computing device cause the one or more processors to:
receive, at the first computing device, a request from a second computing device to authorize an operation;
transmit, by the first computing device and to the second computing device, a request for a first authentication factor based at least in part on receiving the request from the second computing device to authorize the operation;
receive, at the first computing device associated with a first individual, the first authentication factor from the second computing device based at least in part on transmitting the request for the first authentication factor;
validating, by the first computing device, the received first authentication factor;

send, by the first computing device and in response to validating the first authentication factor, a plurality of requests for a second authentication factor, the plurality of requests comprising a first request for the second authentication factor to the second computing device and a second request for the second authentication factor to a third computing device and a fourth computing device, wherein the second computing device is associated with a second individual, the third computing device is associated with a third individual, and the fourth computing device is associated with a fourth individual;

receive the second authentication factor from the second computing device, the third computing device, and the fourth computing device, the second authentication factor different than the first authentication factor; and authorize, by the first computing device, the operation based at least in part on validating the second authentication factor received from the second computing device, the third computing device, and the fourth computing device.

18. The non-transitory computer-readable medium of claim 17, wherein the first authentication factor or the second authentication factor or both include at least one of a knowledge factor, a possession factor, a disconnected token, a connected token, or an inherence factor, or any combination thereof.

19. The non-transitory computer-readable medium of claim 17, wherein the second authentication factor is sent to three or more computing devices associated with a certain number of individuals predetermined as authorizers of the operation, the three or more computing devices including the second computing device, the third computing device, and the fourth computing device.

20. The non-transitory computer-readable medium of claim 19, wherein the instructions for authorizing the operation are further executable by the one or more processors to:

validate each second authentication factor received from the three or more computing devices; and determine whether a response sent with each received second authentication factor indicates an affirmative response to permit the operation or indicates a rejection response to deny the operation.

* * * * *